(12) United States Patent
Kunieda

(10) Patent No.: US 8,192,517 B2
(45) Date of Patent: Jun. 5, 2012

(54) CERAMIC HONEYCOMB STRUCTURAL BODY

(75) Inventor: Masafumi Kunieda, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 123 days.

(21) Appl. No.: 11/510,590

(22) Filed: Aug. 28, 2006

(65) Prior Publication Data

US 2006/0292393 A1    Dec. 28, 2006

(30) Foreign Application Priority Data

Nov. 14, 2005   (JP) ................................. 2005-021193

(51) Int. Cl.
*B01D 46/00* (2006.01)

(52) U.S. Cl. ..................... 55/523; 55/DIG. 30; 60/311

(58) Field of Classification Search ............ 55/522–524; 502/62–65, 74–85, 208–210, 303; 422/169–182; 60/297; 428/117
See application file for complete search history.

(56) References Cited

U.S. PATENT DOCUMENTS

| | | | | |
|---|---|---|---|---|
| 4,416,676 A | * | 11/1983 | Montierth ..................... | 55/523 |
| 4,419,108 A | * | 12/1983 | Frost et al. ................... | 95/286 |
| 4,505,726 A | * | 3/1985 | Takeuchi et al. ............... | 55/282 |
| 4,508,841 A | | 4/1985 | Onuma et al. | |
| 4,631,267 A | | 12/1986 | Lachman et al. | |
| 5,098,455 A | * | 3/1992 | Doty et al. ..................... | 55/523 |
| 5,194,078 A | * | 3/1993 | Yonemura et al. .............. | 55/466 |
| 5,322,537 A | * | 6/1994 | Nakamura et al. .............. | 55/523 |
| 5,846,276 A | * | 12/1998 | Nagai et al. ..................... | 55/523 |
| 6,669,751 B1 | * | 12/2003 | Ohno et al. ..................... | 55/523 |
| 6,677,261 B1 | * | 1/2004 | Addiego et al. ................ | 501/127 |
| 7,052,532 B1 | * | 5/2006 | Liu et al. .......................... | 96/154 |
| 7,101,601 B2 | * | 9/2006 | Ishihara et al. ................ | 428/116 |
| 7,235,124 B2 | * | 6/2007 | Liu et al. .......................... | 96/154 |
| 2002/0160912 A1 | | 10/2002 | Morikawa et al. | |
| 2004/0033175 A1 | * | 2/2004 | Ohno et al. ..................... | 422/180 |
| 2004/0071932 A1 | * | 4/2004 | Ishihara et al. ................ | 428/116 |
| 2004/0123573 A1 | * | 7/2004 | Ichikawa et al. ................ | 55/523 |
| 2005/0095395 A1 | * | 5/2005 | Miwa .............................. | 428/116 |
| 2005/0109023 A1 | * | 5/2005 | Kudo et al. ...................... | 60/311 |
| 2005/0169819 A1 | * | 8/2005 | Shibata .......................... | 422/177 |

(Continued)

FOREIGN PATENT DOCUMENTS

DE    43 26 938 A1    8/1993

(Continued)

OTHER PUBLICATIONS

U.S. Appl. No. 11/925,394.

(Continued)

*Primary Examiner* — Duane Smith
*Assistant Examiner* — Amber Orlando
(74) *Attorney, Agent, or Firm* — Finnegan, Henderson, Farabow, Garrett & Dunner LLP

(57) ABSTRACT

The ceramic honeycomb structural body comprises a pillar-shaped honeycomb structural porous ceramic member formed by arranging a plurality of through holes as a gas path side by side through partition walls or a combination thereof, in which the ceramic honeycomb structural body is a sintered body having a pore structure in which one or more peaks (the maximum value) exist in each region of a first pore group of pores having a pore size of about 0.05 μm to about 150 μm and of a second pore group of pores having a pore size of about 0.006 μm to about 0.01 μm.

10 Claims, 12 Drawing Sheets

U.S. PATENT DOCUMENTS

| | | |
|---|---|---|
| 2005/0227869 A1 | 10/2005 | Ohno et al. |
| 2005/0266992 A1 | 12/2005 | Ohno et al. |
| 2006/0172113 A1 | 8/2006 | Kunieda |
| 2006/0177629 A1 | 8/2006 | Kunieda |
| 2006/0263574 A1 | 11/2006 | Tsunekawa et al. |
| 2006/0292044 A1 | 12/2006 | Ohno et al. |
| 2006/0292330 A1 | 12/2006 | Ohno et al. |
| 2006/0292331 A1 | 12/2006 | Ohno et al. |
| 2006/0292332 A1 | 12/2006 | Ohno et al. |
| 2006/0292333 A1 | 12/2006 | Ohno et al. |
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292338 A1 | 12/2006 | Ohno et al. |
| 2006/0292339 A1 | 12/2006 | Ohno et al. |
| 2006/0292340 A1 | 12/2006 | Ohno et al. |
| 2006/0292341 A1 | 12/2006 | Ohno et al. |
| 2006/0292342 A1 | 12/2006 | Ohno et al. |
| 2007/0004592 A1 | 1/2007 | Ohno et al. |
| 2007/0004593 A1 | 1/2007 | Ohno et al. |
| 2007/0039295 A1 | 2/2007 | Ohno |
| 2007/0077190 A1 | 4/2007 | Ohno |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |
| 2009/0239744 A1 | 9/2009 | Ohno et al. |
| 2009/0246099 A1 | 10/2009 | Ohno et al. |
| 2009/0247395 A1 | 10/2009 | Kunieda et al. |

FOREIGN PATENT DOCUMENTS

| | | |
|---|---|---|
| EP | 1 043 067 A2 | 10/2000 |
| EP | 1 043 067 A3 | 10/2000 |
| EP | 1 808 217 A1 | 10/2005 |
| EP | 1 674 147 | 6/2006 |
| JP | 57-123820 | 8/1982 |
| JP | 03-068456 | 3/1991 |
| JP | 04-161230 | 6/1992 |
| JP | 05-213681 | 8/1993 |
| JP | 08-229412 | 9/1996 |
| JP | 10-043588 | 2/1998 |
| JP | 10-263416 | 10/1998 |
| JP | 2000-503886 | 4/2000 |
| JP | 2001-187318 | 7/2001 |
| JP | 2001-187320 | 7/2001 |
| JP | 2003-251201 | 9/2003 |
| JP | 2004-051384 | 2/2004 |
| JP | 2004-3300118 | 11/2004 |
| WO | WO 97/26988 | 7/1997 |
| WO | WO 00/43325 | 7/2000 |
| WO | WO03081001 | * 10/2003 |
| WO | WO 2004/011385 | 2/2004 |
| WO | WO 2006-025283 | 3/2006 |
| WO | WO 2006-040874 | 4/2006 |

OTHER PUBLICATIONS

U.S. Appl. No. 11/853,658.
U.S. Appl. No. 11/928,546.
European Patent Office, Supplementary European Search Report dated Jan. 8, 2008 on Application No./ Patent No. 05806768.7-2104 PCT/JP2005021193 (10 pgs.).
Korean Office Action issued Jun. 27, 2007 for Korean Patent Application No. 2006-7017599.
U.S. Appl. No. 12/194,888.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.
Co-Pending U.S. Appl. No. 12/379,768, filed Feb. 27, 2009.
Co-Pending U.S. Appl. No. 12/516,813, filed May 29, 2009.
Co-pending U.S. Appl. No. 12/343,965, filed Dec. 24, 2008, to Kazushige Ohno et al., entitled "Honeycomb Structure and Manufacturing Method of the Honeycomb Structure."
Co-pending U.S. Appl. No. 12/346,610, filed Dec. 30, 2008, to Masafumi Kunieda et al., entitled "Honeycomb Structure."
Co-pending U.S. Appl. No. 12/346,628, filed Dec. 30, 2008, to Kazushige Ohno et al., entitled "Honeycomb Structure."
Co-pending U.S. Appl. No. 12/355,990, filed Jan. 19, 2009, to Kazushige Ohno et al., entitled "Honeycomb Structure."
Co-pending U.S. Appl. No. 12/355,999, filed Jan. 19, 2009, to Kazushige Ohno et al., entitled "Honeycomb Structure."
Co-pending U.S. Appl. No. 12/358,937, filed Jan. 23, 2009, to Kazushige Ohno et al., entitled "Honeycomb Structure."
Co-pending U.S. Appl. No. 12/359,957, filed Jan. 26, 2009, to Kazushige Ohno et al., entitled "Honeycomb Structure."
Co-pending U.S. Appl. No. 12/359,969, filed Jan. 26, 2009, to Kazushige Ohno et al., entitled "Honeycomb Structure."
Co-pending U.S. Appl. No. 12/362,310, filed Jan. 29, 2009, to Kazushige Ohno et al., entitled "Honeycomb Structure, Exhaust Gas Cleaning Unit, and Manufacturing Method of Honeycomb Structure."
Co-pending U.S. Appl. No. 12/367,780, filed Feb. 9, 2009, to Kazushige Ohno et al., entitled "Honeycomb Structure."
Co-pending U.S. Appl. No. 12/368,514, filed Feb. 10, 2009, to Masafumi Kunieda et al., entitled "Honeycomb Structure."
Co-pending U.S. Appl. No. 12/368,551, filed Feb. 10, 2009, to Kazushige Ohno et al., entitled "Honeycomb Structure."
Co-pending U.S. Appl. No. 12/369,347, filed Feb. 11, 2009, to Kazushige Ohno et al., entitled "Honeycomb Structure."
Co-pending U.S. Appl. No. 12/372,192, filed Feb. 17, 2009, to Kazushige Ohno et al., entitled "Honeycomb Structure."
Co-pending U.S. Appl. No. 12/372,229, filed Feb. 17, 2009, to Kazushige Ohno et al., entitled "Honeycomb Structure."
Co-pending U.S. Appl. No. 12/389,338, filed Feb. 19, 2009, to Kazushige Ohno et al., entitled "Honeycomb Structure."
Co-pending U.S. Appl. No. 12/389,343, filed Feb. 19 2009, to Kazushige Ohno et al., entitled "Honeycomb Structure and Process for Manufacturing Honeycomb Structure."
Decision to refuse a European Application dated Nov. 1, 2011, in counterpart application EP 05 806 768.7.
Summons to attend oral proceedings dated Jan. 4, 2010, in counterpart application EP 05 806 768.7.

* cited by examiner

Honeycomb unit 11

Honeycomb structure 10

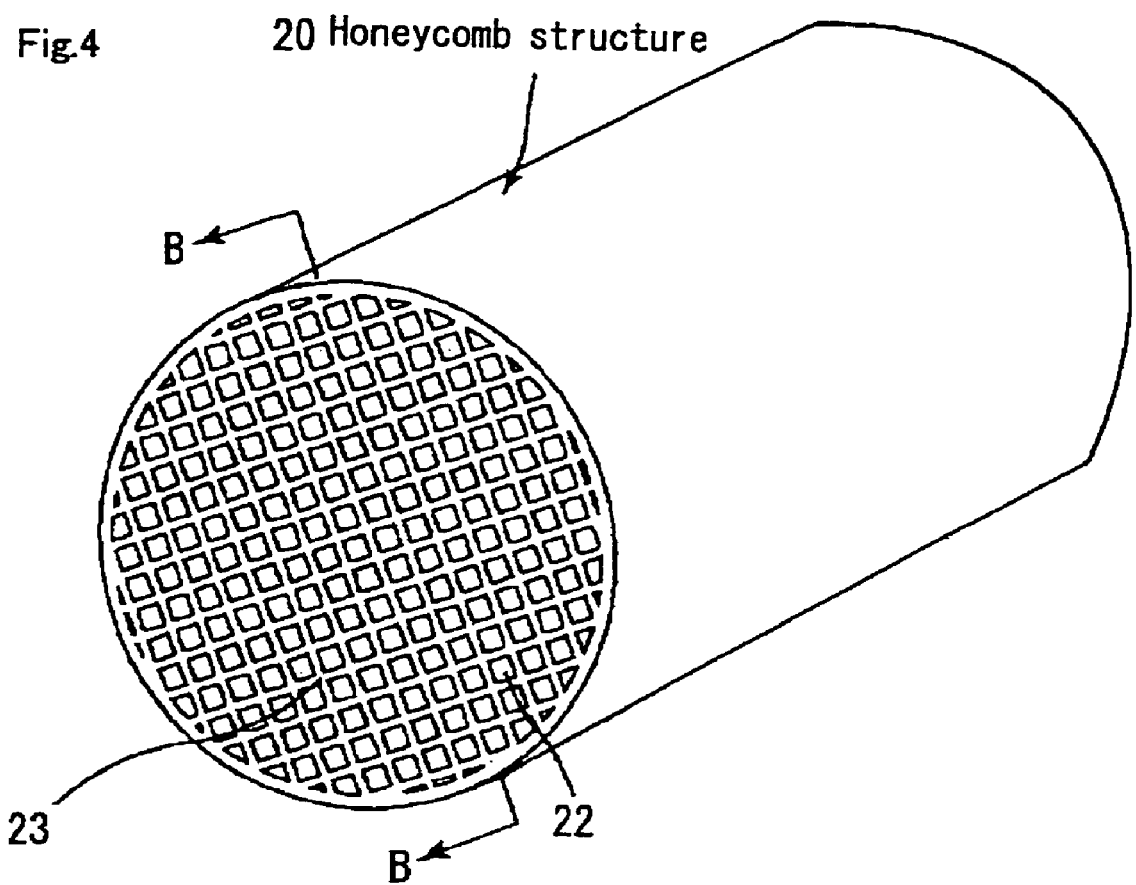
Fig.4   20 Honeycomb structure
B
23   22
   B

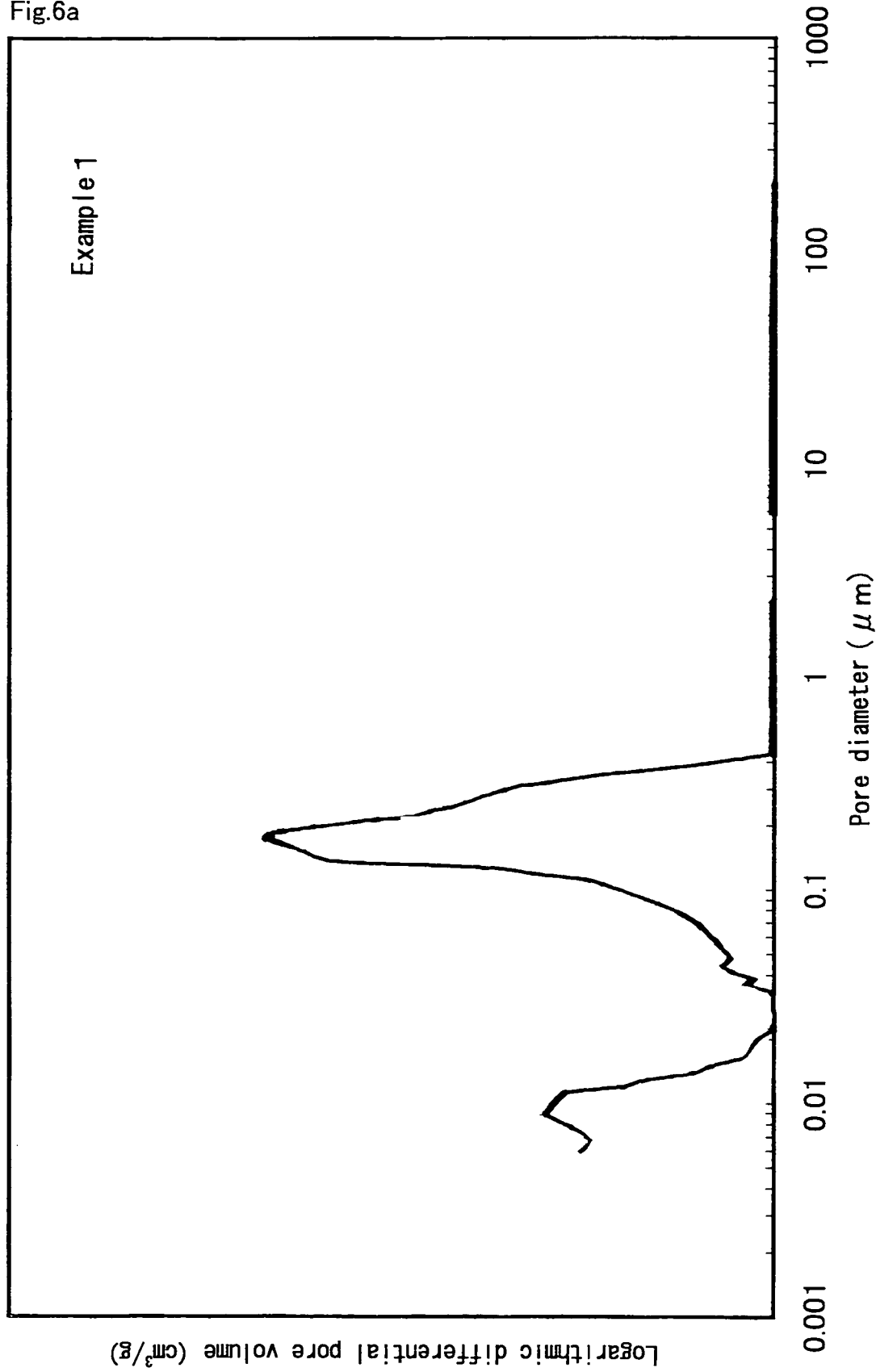

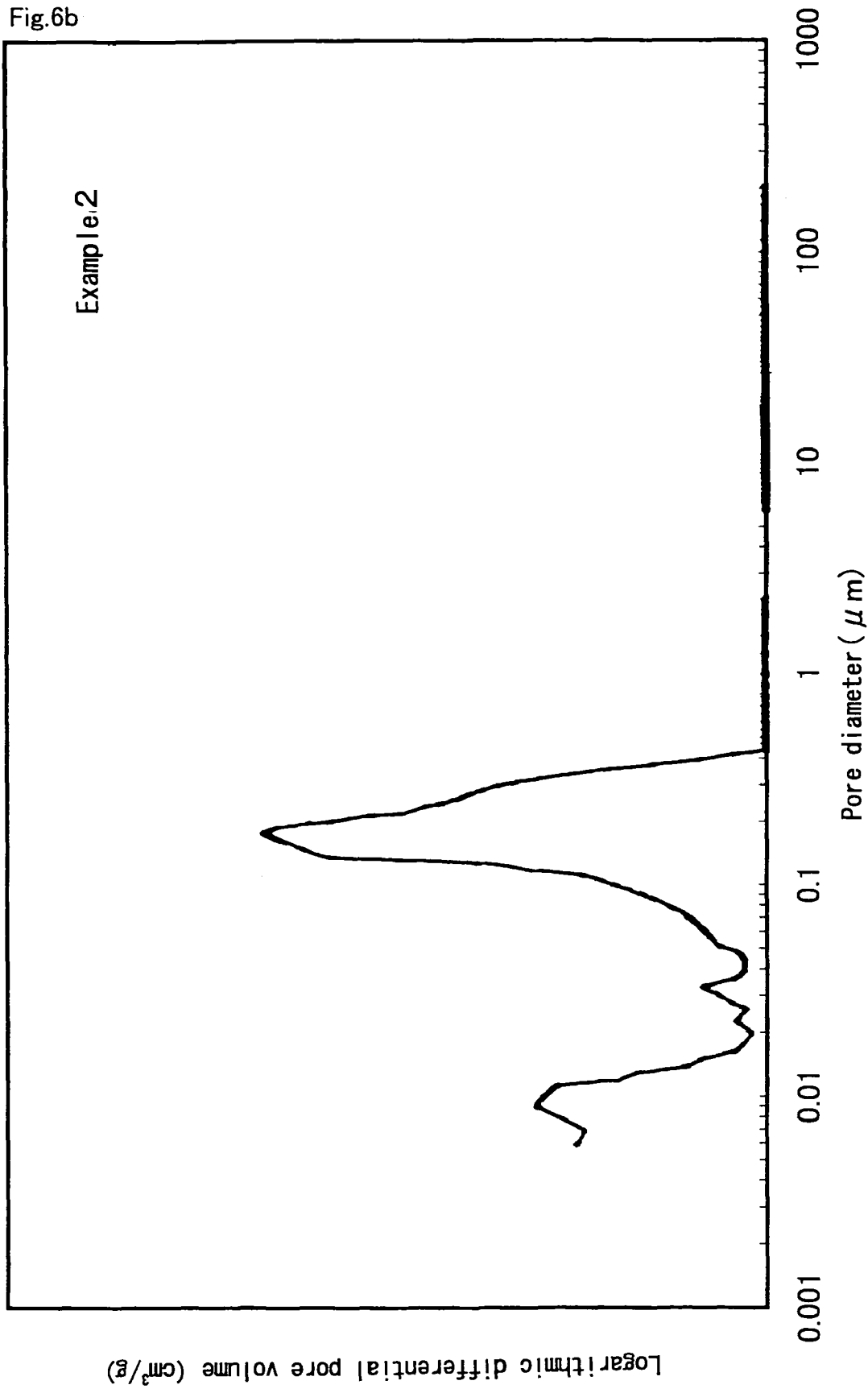
Fig.6b Example 2

CERAMIC HONEYCOMB STRUCTURAL BODY

RELATED APPLICATION

This application is an application claiming a priority of Japanese Patent Application No. 2004-375815 filed on Dec. 27, 2004 and an International application No. PCT/JP2005/021193 filed on Nov. 14, 2005. The contents of these applications are incorporated herein by reference in their entirety.

TECHNICAL FIELD

This invention relates to a ceramic honeycomb structural body.

BACKGROUND ART

As the ceramic honeycomb structural body used for carrying a catalyst for the purification (conversion) of the exhaust gas from vehicles is mainly used an integrally structural product made from a low thermal expansive cordierite or the like. Such a ceramic honeycomb structural body is common to support a material having a high specific surface area such as an active alumina or the like, and a catalyst metal such as platinum or the like on its surface. Also, in engines used under excess oxygen conditions such as lean burn engine and diesel engine, NOx occlusion agent made from an alkaline earth metal such as Ba or the like for the NOx treatment is carried on the surface of the structural body.

In order to further improve the purification (conversion) performance of the ceramic honeycomb structural body, it is effective to increase the contact efficiency between the exhaust gas and the noble metal catalyst or the NOx occlusion agent. For this end, it is important to carry the catalyst on the surface of the partition wall of the ceramic honeycomb structural body in a well-dispersed condition. (See JP-A-10-263416)

Also, as the ceramic honeycomb structural body, there is proposed a technique for improving the reactivity by adjusting the pore size distribution (See JP-A-03-68456, JP-A-08-229412, JP-A-2001-187318, JP-A-2001-187320, JP-A-10-43588). The contents of JP-A-10-263416, JP-A-03-68456, JP-A-08-229412, JP-A-2001-187318, JP-A-2001-187320 and JP-A-10-43588 are incorporated herein by reference in their entirety.

SUMMARY OF THE INVENTION

One embodiment according to the present invention lies in a ceramic honeycomb structural body comprising one porous ceramic member of a pillar-shaped honeycomb structure formed by arranging a plurality of through-holes as a gas path side by side through a partition wall, or a combination of the ceramic members, wherein the partition wall is made from a sintered body having a pore structure that in a pore size distribution curve in which an abscissa is a pore diameter (μm) and an ordinate is a logarithmic differential pore volume (cm³/g), when pores having a pore diameter of about 0.05 μm to about 150 μm are a first pore group and pores having a pore diameter of about 0.006 μm to about 0.01 μm are a second pore group, one or more peaks (maximum value) of the pore distribution are existent in each region of the first pore group and the second pore group.

The followings are a preferable embodiment of the construction of the invention, but are not intended as limitations thereof.

(1) The peak of the pore size distribution of pores in the region of the first pore group is existent within a pore size range of about 0.05 μm to about 1.0 μm;
(2) The pore size distribution curve is continuous when the value of the logarithmic differential pore volume is positive within a pore size range of about 0.01 μm to about 1.0 μm;
(3) The pore size distribution curve is continuous when the value of the logarithmic differential pore volume is positive in a range of the pore sizes between the peaks (maximum values) in the first pore group and the second pore group;
(4) The partition wall has a thickness of about 0.05 mm to about 0.35 mm;
(5) The ceramic member includes an alumina as a main component;
(6) When a plurality of the ceramic members are combined, a sealing material layer is interposed between the members;
(7) In the ceramic member, a catalyst is applied onto the surface of the partition wall or onto each surface of the ceramic particles constituting the partition wall; and
(8) The honeycomb structural body is used as an exhaust gas purification (conversion) apparatus in vehicles.

BRIEF DESCRIPTION OF THE DRAWINGS

FIG. 4 is a perspective view of a integrated type honeycomb filter using porous ceramic members;

FIG. 6a is a graph showing a relation between a pore size and a pore volume in a honeycomb unit according to the invention (Example 1), FIG. 6b is a graph showing a relation between a pore size and a pore volume in a honeycomb unit according to the invention (Example 2)

DETAILED DESCRIPTION OF THE PREFERRED EMBODIMENTS

The inventors have examined the pore structure of the honeycomb structural body (sintered body) made of a porous ceramic used in the exhaust gas purification (conversion) apparatus and the like. In the examination, the inventors have made studies on an example of changing the state of the pore size distribution in the structural body by adjusting the kind, particle size, compounding amount, compounding ratio of the starting materials, the firing temperature and the like. As a result, the inventors found that in the case of the ceramic honeycomb structural body, for example, used as a catalyst carrier, even if the porosity is the same, a great difference in the purification (conversion) efficiency is caused in accordance with the difference in the pore size distribution.

Figure 1:
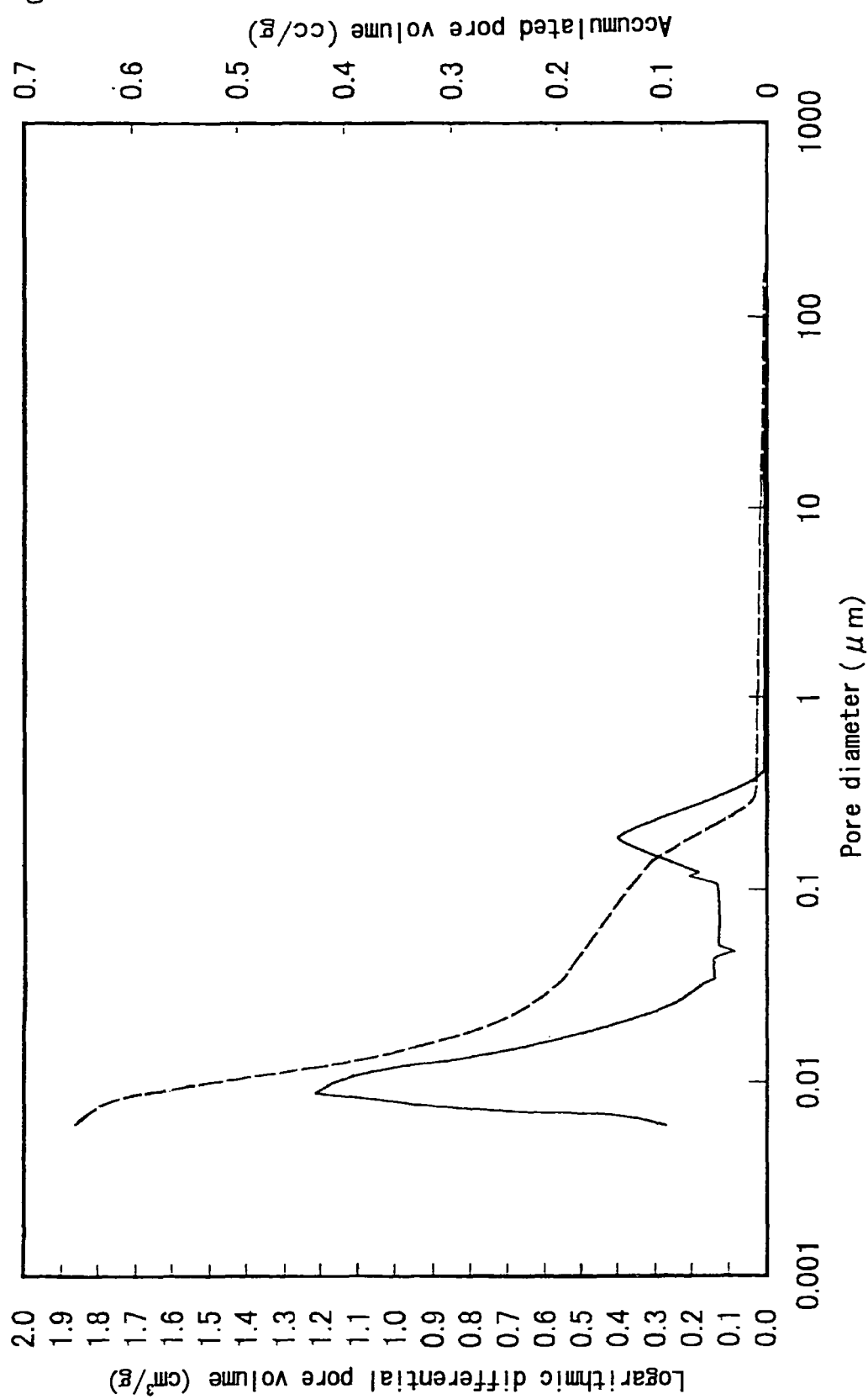
FIG. 1 is a graph showing an example of a pore size distribution curve in the ceramic honeycomb structural body according to the invention.

That is, in the curve of pore size distribution measured by a mercury penetration method in which an abscissa is a pore diameter (μm) and an ordinate is a logarithmic differential pore volume ($cm^3/g$) as shown in FIG. 1, the pore structure of the partition wall in the ceramic sintered body is good in the catalyst reactivity and effective in the purification (conversion) of the exhaust gas when one peak of the pore size distribution (maximum value) is existent in the range of about 0.05 μm to about 150 μm as the region of the first pore group and one or more peaks of the pore size distribution are existent in the range of about 0.006 μm to about 0.01 μm as the region of the second pore group, preferably two peaks are existent around 0.2 μm and around 0.009 μm.

Figure 2:
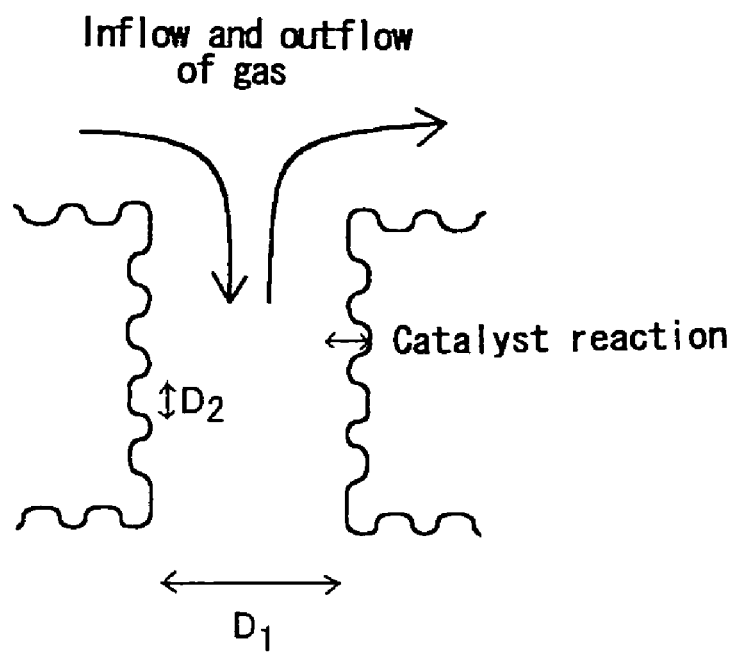
FIG. 2a is a cross-sectional view schematically showing an example of pores formed in the ceramic honeycomb structural body according to the invention.
FIGS. 2b and 2c are cross sectional views schematically showing a state of conventional fine pores.
Figure 2:
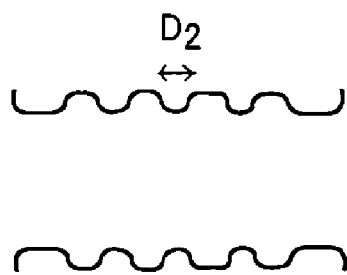
Figure 2:
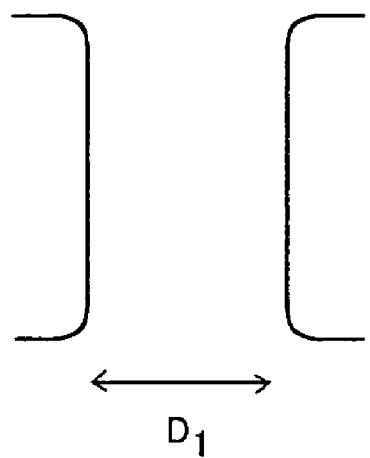

As to the mechanism causing such a phenomenon, the inventors have guessed as follows. FIG. 2a is a representative schematic view of a ceramic member in which a peak of the pore size distribution is existent in each region of the first pore group and the second pore group, more particularly of a surface structure at a partition wall portion thereof. The surface structure shows such an example that pores having a large pore size $D_1$ of about 0.05 μm to about 150 μm and pores having a small pore size $D_2$ of about 0.06 μm to about 0.01 μm belonging to the second region of the pore size are existent sterically or in parallel on the same plane as shown in the figure. The invention is not limited to only the illustrated surface structure and may have a structure that pores having two or three different pore sizes are opened on the same plane.

FIG. 2b and FIG. 2c are schematic views of the surface structure in the partition wall of the conventional structural body, in which FIG. 2b is an example in which only pores having a small pore size are existent and FIG. 2c is an example in which only pores having a large pore size are existent.

Among these illustrated examples, the pore structure shown in FIG. 2a is an example of having plural kinds of pores having different pore sizes in the pores. In this case, it is considered that the pore having the large pore size $D_1$ has a role of allowing the exhaust gas to penetrate into of the partition wall through the pores to efficiently promote the reaction of the gas even in the inside of the partition wall to thereby improve the efficiency of the gas exchange before and after the reaction. While, the role of the pores having the small pore size $D_2$ belonging to the second pore group is considered to promote the reaction of the catalyst dispersed into and carried on the surfaces of the partition walls with the exhaust gas. As a result, in the pore structure suitable for the invention, molecules of the exhaust gas or the like easily penetrate into the inside of the wall of the catalyst carrier.

In the pore structure shown in FIG. 2b, the gas does not penetrate into the inside of the partition wall and the reaction with the catalyst in the inside of the wall becomes weak. Also, in the pore structure shown in FIG. 2c, the gas may penetrate into the inside of the wall, but the reaction with the catalyst cannot be promoted.

The pore structure as a preferable embodiment of the invention can be formed, for example, by changing the particle size or composition of alumina or the like as the high specific area material constituting the catalyst carrier, and is effective as a means for improving the catalyst activity of the honeycomb structural body. For example, in case of the ceramic honeycomb structural body having the pore structure of the pore size distribution curve as shown in FIG. 1 formed by changing the particle size of alumina constituting the catalyst carrier, the purification (conversion) property of the exhaust gas is particularly good.

That is, when the ceramic honeycomb structural body shows the pore size distribution curve of the partition wall as shown in FIG. 1 which divides into the region of the first pore group consisting of pores having a pore size of about 0.05 μm to about 150 μm and the region of the second pore group consisting of pores having a pore size of about 0.006 μm to about 0.01 μm, if the pore structure has a peak (maximum value) in each of these regions, the purification (conversion) efficiency of the exhaust gas can be improved.

In the ceramic honeycomb structural body having such a construction, when the pore size distribution of the partition wall (cell wall) is adjusted to have a peak even in the region of the second pore group (about 0.006 μm to about 0.01 μm), the whole of the partition wall renders into a high specific surface area, so that the particles of the catalyst metal can be made small and the dispersivility can be increased. Hence, the contact ratio of the exhaust gas with the catalyst metal and/or NOx absorption material can be increased to improve the purification (conversion) efficiency of the exhaust gas.

In this case, since the specific surface area becomes large, the surface of the partition wall can ensure a high reactivity. In the ceramic honeycomb structural body having such a pore size distribution, however, since the pore size of each of the pores is small, it is difficult to sufficiently penetrate the gas into the inside of the partition wall in the thickness direction and it is considered that the catalytic reaction may hardly occur in the inside of the partition wall.

In a preferable embodiment of the invention, therefore, the pore structure of the partition wall is rendered to have a peak in the pore size distribution of the first pore group (about 0.05 μm to about 150 μm). As a result, the gas is easy to deeply penetrate into the partition wall in the thickness direction and hence the purification (conversion) reaction of the gas occurs even in the inside of the partition wall, which brings about the improvement of the reactivity as a whole.

In a preferable embodiment of the invention, the pore size distribution of the pores belonging to the first pore group is constructed such that one or more peaks are existent in a range of about 0.05 μm to about 1.0 μm. When the partition wall has such a structure, it is considered that the gas easily penetrates into the interior of the partition wall.

The thickness of the partition wall is about 0.05 mm to about 0.35 mm, preferably about 0.10 mm to about 0.30 mm, more preferably about 0.15 mm to about 0.25 mm in connection with the pore structure. When the wall thickness is about 0.35 mm or less, it can be expected that the contact area to the exhaust gas easily penetrates into the inside of the partition wall to improve the catalytic performance. And, when the thickness is about 0.05 mm or more, there is no fear that the strength lowers.

In the ceramic honeycomb structural body, it is desirable that pore size distribution curve is continuous when the pore diameter of the pores in the first pore group is within a range of about 0.01 μm to about 1.0 μm and/or the value of the logarithmic differential pore volume is positive in the region between peak values producing in the first and second pore groups. That is, as shown in the graph of the accumulated pore volume (cc/g) (shown by dotted lines) in FIG. 1, it is desirable that this curve rises continuously. At this state, it is considered that the purification (conversion) for a wide variety of gases is possible regardless of the easiness of absorption depending on the size of the molecule or the like of the exhaust gas components discharged from the automobile.

In the embodiment of ceramic honeycomb structural bodies according to the present invention, when the high specific surface area material such as alumina or the like is used in the ceramic honeycomb structural body, it will become easy to prevent making progress of sintering due to the heat aging and lowering of the specific surface area.

Also, according to the embodiment of the present invention, the catalyst metal carried such as platinum or the like will not easily be aggregated to increase the particle size, thereby the specific surface area will not easily be reduced. Thus, in the embodiment of ceramic honeycomb structural body according to the present invention, it will become easy to increase the specific surface area at the initial stage.

Also, according to the embodiment of the present invention, it is possible to increase the gas purification (conversion) capability of the ceramic honeycomb structural bodies, and it is possible to increase the contact efficiency among the exhaust gas and the noble metal catalyst and the NOx occlusion agent. That is, it is possible to increase the specific surface area of the ceramic honeycomb structural body as a carrier, and it will become easy to increase the dispersion degree by reducing the particle size of the catalyst metal. Therefore, in the embodiment according to the invention, the catalyst can be sufficiently dispersed on the carrier, and the purification (conversion) performance of the exhaust gas after the heat aging will not easily be lowered.

Further, in the embodiment of the honeycomb structural bodies according to the present invention, it is not necessary to carry a large amount of the catalyst and the size of the catalyst carrier itself is not necessary to be enlarged. Thus, the amount of expensive catalyst carried on the honeycomb structural body, i.e. a noble metal such as platinum or the like, can be reduced. Furthermore, in case that the honeycomb structural body is arranged in the vehicle, the installation space is limited, however, the embodiment of honeycomb structural body according to the present invention can be downsized and it is effective to be arranged in the vehicle.

The ceramic honeycomb structural body according to a preferable embodiment of the invention is formed by using one unit or a combination of plural units when a porous ceramic member of a pillar-shaped honeycomb structure comprising a plurality of through-holes (cells) arranged side by side through the partition walls (hereinafter simply abbreviated as "honeycomb unit") is a constitutional unit. That is, the ceramic honeycomb structural body simply called in the invention includes not only the structural body formed by combining a plurality of honeycomb units through a sealing material layer (hereinafter referred to as "an aggregate type honeycomb structural body), but also the structural body comprising a single honeycomb unit as a whole (hereinafter referred to as "integrated type honeycomb structural body").

In the aggregate type honeycomb structural body, a sealing material layer for sealing the adjacent honeycomb units is necessary, and a coating material layer may be arranged on the outermost portion. However, since the integrated type honeycomb structural body consists of a single honeycomb unit, the sealing material layer at least interposed between the mutual honeycomb units is useless.

Figure 3A:
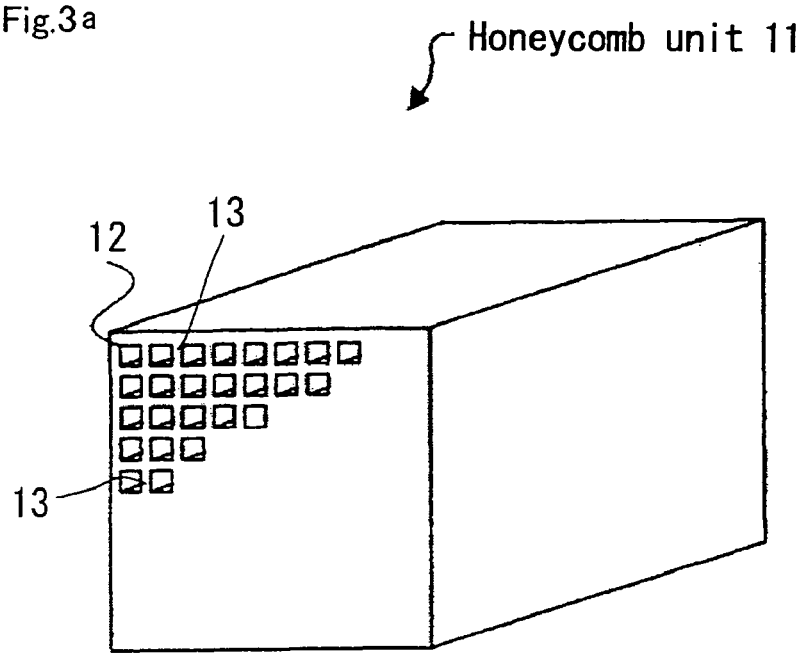
FIG. 3a is a perspective view showing an example of the ceramic honeycomb structural body according to the invention.
Figure 3B:
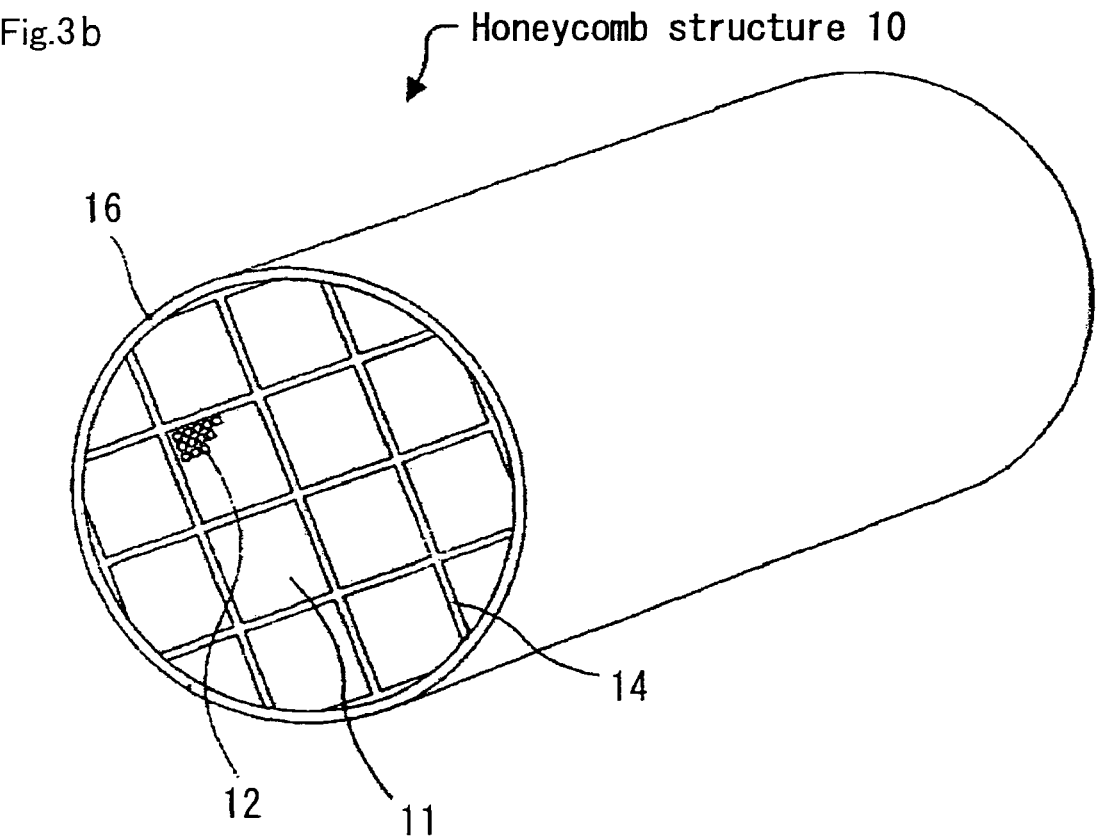
FIG. 3b is a perspective view showing an example of the aggregate type honeycomb filter.

FIG. 3a is a perspective view partly omitted of an example of the porous ceramic member (honeycomb unit 11) used in the aggregate type honeycomb structural body as an example of the ceramic honeycomb structural body according to the invention. FIG. 3b is a perspective view of an exhaust gas purification (conversion) apparatus comprising the aggregate type honeycomb structural body formed by combining a plurality of the honeycomb units shown in FIG. 3a. In the aggregate type honeycomb structural body, the honeycomb unit 11 has a plurality of through-holes (cells) 12 as a gas path and partition walls (cell walls) 13. The honeycomb unit 11 is preferable to have a shape of easily bonding the honeycomb units 11 with each other, and the cross-sectional shape perpendicular to the through-hole may be square, rectangular, hexagonal, fan-shape, or the combination thereof.

As shown in FIG. 3b, the aggregate type honeycomb structural body 10 is a block formed by bonding a plurality of the honeycomb units 11 through a sealing material layer 14. Preferably, a coating material layer 16 for preventing the leakage of the exhaust gas or ensuring the strength may be formed on the outer periphery of the block.

One of the features of the aggregate type honeycomb structural body lies in that the strength against the thermal shock or vibration is high. Because, it is presumed that even when the temperature distribution is produced in the honeycomb structural body due to a rapid temperature change or the like, the temperature difference in the structural body can be controlled to a small value and the thermal shock can be mitigated through the sealing material layer 14. Particularly, even when cracks are generated in the honeycomb unit, for example, due to the thermal stress or the like, the sealing material layer 14 is effective to prevent the progress of such cracks generated in the unit to the whole of the honeycomb structural body. Further, since it plays the role as a part of the main honeycomb structural body (frame), it is considered to be effective in maintaining the shape as a honeycomb structural body and the function as a catalyst carrier.

It is preferable that the honeycomb unit 11 constituting the aggregate type honeycomb structural body is made of a porous ceramic and the area of the cross section perpendicular to the through-hole 12 (the size of the unit itself, hereinafter referred to as "cross sectional area" simply) is about 5 $cm^2$ to about 50 $cm^2$. When the cross sectional area is about 5 $cm^2$ or more, the cross sectional area of the sealing material layer 14 bonding the plural honeycomb units does not become large, causing no increase in the pressure loss, and also the specific surface area supporting the catalyst becomes relatively large, so that the catalyst component can be efficiently dispersed. Also, when the cross sectional area is about 50 $cm^2$ or less, the size of the honeycomb unit does not become too large and the thermal stress generated in each of the honeycomb units can be sufficiently restrained. Moreover, the cross sectional area is preferably about 6 $cm^2$ to about 40 $cm^2$, more preferably about 8 $cm^2$ to about 30 $cm^2$.

Moreover, the honeycomb unit 11 having a cross sectional area of the above range is practical, because the pressure loss can be kept small while maintaining the specific surface area large and also a sufficient strength against the thermal shock (thermal stress) and a high resistance to vibration or a high durability are indicated.

The term "cross sectional area of honeycomb unit" used herein means a cross sectional area of a honeycomb unit as a basic unit constituting the honeycomb structural body when the honeycomb structural body comprises a plurality of honeycomb units each having different cross sectional areas, and generally means a largest cross sectional area. Also, the ratio of the total cross sectional area of the honeycomb units to the cross sectional area of the honeycomb structural body is preferably about 85% or more, more preferably about 90% or more. When the ratio of the honeycomb units is about 85% or less, the ratio of the honeycomb units occupied in the total cross sectional area increases, so that the specific surface area supporting the catalyst becomes relatively large and the cross sectional area of the sealing material layer 14 becomes relatively small, thereby the pressure loss becomes small. Also, when the ratio is about 90% or more, the pressure loss can be further reduced.

In the ceramic honeycomb structural body, it is preferable to use ceramic particles having a high specific surface area as a material constituting the honeycomb unit itself. For example, one or more particles selected from alumina, silica, zirconia, titania, ceria, mullite and zeolite can be used, and among them, the use of alumina is preferable.

The porosity of the honeycomb unit is about 20% to about 80%, preferably about 50% to about 70%. When the porosity is about 20% or more, the gas may be easily penetrated into the inside of the wall, and also, when the porosity is about 80% or less, the strength of the ceramic member is not lowered, and the ceramic member is not easily broken.

The porosity can be measured by the conventionally known methods such as a mercury penetration method, Archimedes' method, a measurement using a scanning electron microscope (SEM) and the like.

The above-mentioned honeycomb structural body may be constructed with a porous honeycomb ceramic member(s) (honeycomb unit) produced by mixing an inorganic material of a first embodiment (an inorganic material having a large specific surface area) with a different kind of material such as an inorganic material of a second embodiment (hereinafter referred to as "high specific surface area honeycomb unit").

The high specific surface area honeycomb unit is preferable to include at least ceramic particles and an inorganic binder, or ceramic particles, an inorganic reinforcement material and an inorganic binder.

In such a honeycomb unit, the inorganic particles can be bonded (adhered) through the inorganic binder. In this case, when the inorganic particles are composed of particles having a high specific surface area, the specific surface area per high unit volume of the honeycomb unit becomes large and also it is effective to provide a honeycomb structural body having a strength for stably maintaining the honeycomb shape.

Further, the honeycomb unit can be provided with a higher strength by adding the inorganic reinforcement material, whereby a honeycomb structural body having a high specific surface area per unit volume can be obtained.

As a result, the honeycomb structural body comprising such a honeycomb unit(s) can carry a catalyst component widely dispersed over the structural body to ensure a high specific surface area. Also, even if the ceramic particles of the unit are not sufficiently sintered, it is possible to maintain the shape under a situation subjected to the thermal shock or vibration (e.g., in the case of mounting on the vehicle).

The inorganic material of the first embodiment used in the production of the high specific surface area honeycomb unit is an inorganic material having a predetermined aspect ratio (long side/short side) (high specific surface area particles), and as the inorganic material of the second embodiment is used an inorganic material having an aspect ratio larger than the predetermined aspect ratio. In the honeycomb unit having such a material composition, the strength of the honeycomb unit can be increased by adding the inorganic material of the second embodiment having the larger aspect ratio. The inorganic material of the second embodiment is preferable to have an aspect ratio of about 2 to about 1000, more preferably about 5 to about 800, further preferably about 10 to about 500. When the aspect ratio of the inorganic material of the second embodiment is about 2 or more, the contribution to the improvement of the strength in the honeycomb structural body becomes large. Also, when it is about 1000 or less, the clogging may not easily occur in a mold at the shaping and the formability may not become worse. Also, the inorganic material does not easily break at the shaping such as an extrusion molding to cause no scattering in the length, so that the contribution to the improvement of the strength in the honeycomb structural body becomes large. When the aspect ratio of the inorganic material of the second embodiment has a distribution, the average value may be adopted.

In the invention, the inorganic material of the first embodiment may be ceramic particles having a high specific surface area and the inorganic material of the second embodiment may be inorganic fibers. In such a composition, the strength of the honeycomb unit can be increased by the inorganic fibers.

Also, the inorganic material of the first embodiment may be ceramic particles having a given particle size and the inorganic material of the second embodiment may be ceramic particles having a particle size larger than that of the inorganic material of the first embodiment. In such a composition, the strength of the honeycomb unit is increased by the ceramic particles having the larger particle size.

The inorganic material of the second embodiment is preferable to have a particle size larger than that of the inorganic material of the first embodiment by about 5 times or more, more preferably about 10 times to about 30 times. Concretely, the ceramic particles as the inorganic material of the second embodiment preferably have a particles size of about 10 μm to about 60 μm, more preferably about 20 μm to about 50 μm. When the particle size is about 10 μm or more, the strength of the honeycomb structural body can be sufficiently improved. Also, when it is about 60 μm or less, the clogging may not easily occur in a molding at the shaping, resulting in no deterioration of the formability.

When the particle size of the inorganic material of the first embodiment or the inorganic material of the second embodiment has a distribution, the average value thereof may be used. Also, the ceramic particles for the inorganic material of the second embodiment may be selected from a different kind of the ceramic particles for the inorganic material of the first embodiment, or the same kind of the ceramic particles for the inorganic material of the first embodiment having a different shape (particle shape) or different properties (e.g., particles having a different crystal form and melting temperature).

Further, when the inorganic material of the second embodiment is ceramic particles, the magnification of the particle size of this material can increase the strength of the honeycomb structural body, so that the aspect ratio may be the same as that of the inorganic material of the first embodiment.

When ceramic particles are used as the inorganic material of the first embodiment, the ceramic particles having a large specific surface area are desirable and there may be used, for example, one or more particles selected from alumina, silica, zirconia, titania, ceria, mullite and zeolite. Among them, alumina is particularly preferable.

The inorganic material of the second embodiment is not particularly limited, but there may be used, for example, nitride ceramics such as aluminum nitride, silicon nitride, boron nitride, titanium nitride and the like; carbide ceramics such as silicon carbide, zirconium carbide, titanium carbide, tantalum carbide, tungsten carbide and the like; and oxide ceramics such as alumina, zirconia, cordierite, mullite and the like.

When inorganic fibers are used as the inorganic material of the first embodiment and the inorganic material of the second embodiment, there may be used, for example, ceramic fibers made of alumina, silica, silica-alumina, glass, potassium titanate, aluminum borate and the like; and whiskers made of alumina, silica, zirconia, titania, ceria, mullite, silicon carbide and the like as the inorganic fiber. They can be used alone or in a combination of two or more. Among the inorganic fibers, alumina fiber is desirable.

The amount of the inorganic material of the first embodiment (ceramic particles or the like) compounded is about 30 mass % to about 97 mass %, preferably about 30 mass % to about 90 mass %, more preferably about 40 mass % to about 80 mass %, further preferably about 50 mass % to about 75 mass %. When the amount in the first embodiment is about 30 mass % or more, the specific surface area as the honeycomb structural body becomes large and the catalyst component can be easily and widely dispersed in the carrying of the catalyst compound. Also, when it is about 97 mass % or less, the amount of the inorganic material of the second embodiment (inorganic fibers or the like) compounded for contributing to the increase of the strength becomes large, and hence it is considered to increase the strength of the honeycomb structural body.

The amount of the inorganic material of the second embodiment (inorganic fibers, whiskers or the like) compounded is about 3 mass % to about 70 mass %, preferably about 3 mass % to about 50 mass %, more preferably about 5 mass % to about 40 mass %, further preferably about 8 mass % to about 30 mass %. When the amount of the inorganic material of the second embodiment compounded is about 3 mass % or more, the strength of the honeycomb structural body is increased. Also, when it is about 70 mass % or less, the amount of the inorganic material of the first embodiment compounded for contributing to the increase of the specific surface area becomes relatively large, and hence the specific surface area as the honeycomb structural body becomes large and the catalyst component can easily and sufficiently be dispersed.

An inorganic binder can be used in the production of the honeycomb unit. It is effective to provide a sufficient strength even if the firing temperature of the honeycomb unit is lowered. As the inorganic binder may be used, for example, an inorganic sol, a clay-based binder and the like. Among them may be used, for example, one or more inorganic sols selected from alumina sol, silica sol, titania sol, water glass and the like as the inorganic sol. As the clay-based binder may be used, for example, one or more clay-based binders selected from while clay, kaoline, montmorillonite, multi-chain structural clay (sepiolite, attapulgite) and the like.

The amount of the inorganic binder compounded as a solid content is about 50 parts by mass or less, preferably about 5 parts by mass to about 50 parts by mass, more preferably about 10 parts by mass to about 40 parts by mass, further preferably about 15 parts by mass to about 35 parts by mass based on 100 parts by mass of the total amount of the inorganic material of the first embodiment and the inorganic material of the second embodiment. When the amount of the inorganic binder is about 50 parts by mass or more, it is considered that the formability becomes worse.

The number of the through-holes formed in the honeycomb unit per unit cross sectional area (through-hole density) is preferably about 15.5 holes/cm$^2$ to about 186 holes/cm$^2$ (about 100 cpsi to about 1200 cpsi), more preferably about 46.5 holes/cm$^2$ to about 170.5 holes/cm$^2$ (about 300 cpsi to about 1100 cpsi), further preferably about 62.0 holes/cm$^2$ to about 155 holes/cm$^2$ (about 400 cpsi to about 1000 cpsi). When the density of the through-holes is about 15.5 holes/cm$^2$ or more, the area of the walls contacting with the exhaust gas in the porous honeycomb unit becomes large. Also, when it is about 186 holes/cm$^2$ or less, the pressure loss does not increase and manufacturing of the honeycomb unit does not become difficult.

The cross sectional shape of the through-hole formed in the honeycomb unit is preferable to be approximately triangle or hexagon. Because, it is considered to enhance the strength of the honeycomb unit to increase the strength of the ceramic honeycomb structural body (e.g., isostatic strength or the like) without lowering the pressure loss, the exhaust gas purification (conversion) capability and the like. For example, when the cross sectional shape of the through-hole is triangle, the through-holes 12 having the triangle cross section are arranged opposite to each other alternately above and below or the apexes of the 4 through-holes having the triangle cross section are arranged opposite to each other to form a square. Also, a through-hole having a hexagonal cross section may be formed.

It is effective to use the ceramic honeycomb structural body suitable for the invention as a carrier for carrying a catalyst component on the surfaces of the partition walls of the honeycomb unit or on the surfaces of the ceramic particles constituting the partition wall. In this case, the ceramic honeycomb structural body is a honeycomb catalyst. As the catalyst compound carried in the structural body may be used, for example, a noble metal, an alkaline metal compound, an alkaline earth metal compound, an oxide and the like. As the noble metal may be used, for example, one or more selected from platinum, palladium and rhodium. As the alkaline metal compound may be used, for example, compounds of one or more selected from potassium, sodium and the like. As the alkaline earth metal compound may be used, for example, a compound of barium or the like. As the oxide may be used perovskite ($La_{0.75}K_{0.25}MnO_3$ and the like), $CeO_2$ or the like.

The honeycomb catalyst can be used, for example, as a so-called three-way catalyst, or NOx absorption catalyst for the purification (conversion) of the exhaust gas discharged from automobiles. Also, the catalyst component can be carried after the production of the ceramic honeycomb structural body or at the stage of the ceramic particles as the starting material. The carrying of the catalyst component can be conducted, for example, by the impregnation method or the like.

An example of the production method of the ceramic honeycomb structural body according to the invention will be described below. Firstly, a starting paste mainly composed of the aforementioned starting materials (the inorganic material of the first embodiment, the inorganic material of the second embodiment, the inorganic binder and the like) is extrusion-molded to prepare a green shaped body of a honeycomb unit. To the starting paste may be properly added an organic binder, a dispersion medium and a shaping assistance in accordance with the shaping property. As the organic binder can be used, for example, one or more organic binders selected from methylcellulose, carboxymethyl cellulose, hydroxyethyl cellulose, polyethylene glycol, phenol resin and epoxy resin. The amount of the organic binder compounded is preferably about 1 mass % to about 10 mass % based on 100 parts by weight in total of the amounts of the inorganic material of the first embodiment, the inorganic material of the second embodiment and the inorganic binder. As the dispersion medium may be used, for example, water, organic solvent (benzene or the like), alcohol (methanol or the like) and the like. The shaping assistant may be used, for example, ethylene glycol, dextrin, aliphatic acid, aliphatic acid soap, polyvinyl alcohol and the like.

The starting paste may be mixed by a mixer, an attritor or the like, and it is preferable to well mix and knead by means of a kneader or the like. As the method for shaping the starting paste, it is preferable to integrally shape into a honeycomb form having through-holes, for example, by means of the extrusion molding.

Next, the resulting green shaped body is dried. As a drying machine used for the drying may be used, for example, a microwave drying machine, a hot-air drying machine, a dielectric drying machine, a reduce-pressure drying machine, a vacuum drying machine, a freeze drying machine and the like. Then, the thus dried shaped body is preferably subjected to the degreasing. The condition for degreasing may be properly selected according to the kind or amount of the organic matter contained in the shaped body, but a condition of about 400° C. and about 2 hours is preferable. Next, the thus dried shaped body is preferably fired by continuously raising the temperature. The firing is preferably conducted by heating, for example, at a temperature of about 600° C. to about 1200° C.

The reason why the oxide is heated to a temperature of about 600° C. to about 1200° C. in the firing is due to the fact that when the firing temperature is about 600° C. or more, the sintering of the ceramic particles and the like proceeds sufficiently and the strength as the honeycomb structural body increases. Also, when it is about 1200° C. or less, the sintering of the ceramic particles and the like does not excessively proceed and the specific surface area per unit volume becomes large and the catalyst component carried thereon can be easily and sufficiently highly dispersed. Moreover, in the case of the nitride or carbide ceramic, the firing temperature is preferable to be about 1000° C. to about 2200° C.

A fired honeycomb unit made of a porous ceramic having a plurality of through-holes can be obtained through these steps.

The pore size distribution of the thus obtained honeycomb unit is adjusted according to the particle size and the particle size distribution of the material, and the condition of the addition of the slurry.

Next, a sealing material paste as a sealing material layer is applied onto the surfaces of the obtained porous ceramic honeycomb units and the adjoining honeycomb units are sequentially joined and adhered with each other, which is then dried and fixed to prepare a joint body of the honeycomb units having a given size. In this case, as the sealing material for joining the units with each other may be used, for example, a mixture of an inorganic binder and ceramic particles, a mixture of an inorganic binder and inorganic fibers, a mixture of an inorganic binder, ceramic particles and inorganic fibers and the like.

Also, the sealing material may be added with an organic binder. As the organic binder may be used, for example, one or more selected from polyvinyl alcohol, methylcellulose, ethylcellulose, carboxymethyl cellulose and the like.

As the inorganic binder used for the sealing material may be used, for example, silica sol, alumina sol and the like. They may be used alone or in a combination of two or more. Among the inorganic binders, silica sol is desirable.

As the inorganic fiber used for the sealing material may be used, for example, ceramic fibers of silica-alumina, mullite, alumina silica and the like. They may be used alone or in a combination of two or more. Among the inorganic fibers, silica-alumina fiber is desirable.

Further, as the inorganic particles used for the sealing material may be used, for example, carbides, nitrides and the like. Concretely, inorganic powder made of silicon carbide, silicon nitride, boron nitride and the like, a whisker or the like may be used. They may be used alone or in a combination of two or more. Among the inorganic powder, silicon carbide being excellent in the thermal conductivity is desirable.

The sealing material layer 14 interposed between the mutual honeycomb units may be dense or porous, or enables to flow the exhaust gas into the inside. The sealing material layer 16 (coating layer) formed on the outer peripheral portion of the aggregate type honeycomb structural body is desirably made of a dense body. Because, in the case of the sealing material layer 16, when the aggregate type honeycomb structural body according to the invention is installed in the exhaust gas path of the internal engine, it is necessary to prevent the leakage of the exhaust gas from the outer peripheral portion of the honeycomb structural body.

The sealing material layer 14 interposed between the adjoining honeycomb units for bonding and adhering them is preferable to have a thickness of about 0.5 mm to about 2 mm. When the thickness of the sealing material layer 14 is about 0.5 mm or more, the sufficient adhesion strength is obtained. Also, since the sealing material layer 14 is not a portion functioning as a catalyst carrier, when the thickness is about 2 mm or less, the specific surface area per unit volume of the ceramic honeycomb structural body is not relatively lowered and the dispersion efficiency of the catalyst component is increased. Moreover, when the thickness of the sealing material layer 14 is about 2 mm or less, the pressure loss does not easily become large. Further, the number of the honeycomb units joined may be properly determined in accordance with the size of the honeycomb structural body used as a honeycomb catalyst. The joint body formed by joining the honeycomb units through the sealing material may be properly cut and polished in accordance with the size of the ceramic honeycomb structural body to form a product.

Onto the outer peripheral portion (side surface) of the ceramic honeycomb structural body may be applied a coating material, which may be dried and fixed to form a coating material layer, that is, a sealing material layer 16. The sealing material layer 16 functions effectively in protecting the outer peripheral portion of the structural body and increasing its strength. The coating material may be made of the same material as the sealing material layer 14, or may be a different material and the compounding ratio may be the same or different. The thickness of the coating material layer 16 is preferably about 0.1 mm to about 2 mm. When it is 0.1 mm or more, the protection of the outer peripheral portion and the increase of the strength in the structural body can be attained. Also, when it is about 2 mm or less, the specific surface area per unit volume as a honeycomb structural body is not relatively lowered and the catalyst component can be easily and sufficiently dispersed in the carrying thereof.

The aggregate type honeycomb structural body made by combining the plural honeycomb units after the joining through the sealing material layer 14 (provided that if a sealing material layer (coating material layer 16) is formed, after the formation of the coating material layer) is preferable to be calcined. When an organic binder is contained in the sealing material or coating material, it can be degreased and removed through this treatment. The calcination conditions may be determined in accordance with the kind or amount of the organic matter, but they are preferable to be about 700° C. and about 2 hours. The ceramic honeycomb structural body obtained by the calcination does not discharge the contaminated exhaust gas in use since the organic binder included in the ceramic honeycomb structural body is burnt.

As an example of the ceramic honeycomb structural body, FIG. 3b shows a conceptual view of a cylindrical aggregate type honeycomb structural body 10 formed by joining a plurality of rectangular porous honeycomb units 11 having a square cross section. In the aggregate type honeycomb structural body 10, a plurality of the honeycomb units 11 are joined through the sealing material layer 14 and shaped as its outer periphery into a cylindrical form by cutting, and thereafter a sealing material (coating material) is applied onto the outer peripheral portion thereof, i.e. the outer peripheral surface not opening a though-hole 12 to form a sealing material layer 16. Moreover, the cutting step may be omitted when honeycomb units 11 having, for example, a fan-shaped form or a square in their section are shaped and joined so as to previously form a cylindrical ceramic honeycomb structural body.

FIG. 4 is a perspective view showing a integrated type honeycomb structural body as another example of the ceramic honeycomb structural body according to the invention. As shown in this figure, the integrated type honeycomb structural body 20 is a columnar block formed by arranging a plurality of through-holes 21 side by side in the longitudinal direction through partition walls 23.

The integrated type honeycomb structural body is constructed in the same way as the aggregate type honeycomb structural body 10 except that the block has a integrated structure formed by the sintering.

The size of the block 25 is properly determined in accordance with the displacement of the internal engines, the size of the exhaust gas path and the like. Also, the shape of the block 25 may be pillar-shaped, which includes, for example, cylindrical-shaped, elliptic-cylindrical shaped, prismatic-shaped and so on.

EXAMPLES

Ceramic honeycomb structural bodies prepared under various conditions (invention examples and comparative examples) will be explained below, but the invention is not limited to these examples.

The test is carried out in order to confirm the actions and effects when a honeycomb unit made of fiber-reinforced alumina is produced by changing particle size and particle distribution and a catalyst coating layer made of platinum-containing alumina is formed on the surface thereof (the surface of the partition wall). Table 1 shows details of Examples 1-7 and Comparative Examples 1-3. Moreover, the production method of the honeycomb unit is as follows.

(1) At first, 40 mass % of γ-alumina particles (a mixture of primary particles and secondary particles compounded as described in Table 1 provided that an average particle size is 2 μm) is mixed with 10 mass % of silica-alumina fibers (an average fiber diameter: 10 μm, an average fiber length: 100 μm, an aspect ratio: 10) and 50 mass % of silica-sol (solid concentration: 30 mass %), and 6 parts by weight of methyl-cellulose as an organic binder and a small amount of plasticizer and lubricant are added to 100 parts by weight of the resulting mixture and further mixed and kneaded to prepare a mixed composition. Then, the mixed composition is extrusion molded through an extruder to obtain a green shaped body as shown in FIG. 3a.

(2) Next, the green shaped body is sufficiently dried by means of a microwave drying machine and a hot-air drying machine and degreased by holding at 400° C. for 2 hours and then fired by holding at 800° C. for 2 hours to obtain a honeycomb unit 11 made of porous fiber-reinforced alumina having a square columnar shape (34.3 mm×34.3 mm×150 mm), a cell density of 93 cells/cm² (600 cpsi) and a square (quadrilateral) cell form.

(3) A heat-resistant paste for a sealing material is prepared by mixing 29 mass % of γ-alumina particles, 7 mass % of silica-alumina fibers (having an average fiber diameter of 10 μm and an average fiber length of 100 μm), 4 mass % of silica sol (solid concentration of 30 mass %), 50 mass % of carboxymethyl cellulose and 25 mass % of water. The paste for the sealing material is applied on the side surfaces of the honeycomb units 11 to join them with each other. That is, the paste for the sealing material is applied on the outer surface 13 of the honeycomb unit 11 in a thickness of 1 mm to form a sealing material layer 14 and a plurality of honeycomb units 11 are joined with each other through the sealing material layer 14. A joint body as an aggregate type honeycomb unit is thus produced and cut in a cylindrical shape using a diamond cutter so that the front faces are approximately symmetric about a point, and then the paste for the sealing material is applied on the outer surface of the side surface portion not having through-holes in a thickness of 0.5 mm to form a sealing material layer 16 comprising a coating layer on the outer surface.

(4) Thereafter, the obtained joint body is dried at 120° C. and held at 700° C. for 2 hours to conduct the degreasing of the sealing material layer 14 and the sealing material layer (coating layer) 16, whereby a cylindrical aggregate type honeycomb structural body 10 (diameter of 143.8 mm¢×height of 150 mm) is obtained. It is immersed in a solution of platinum nitrite to carry a catalyst component thereon so that the weight of platinum per unit volume of the aggregate type honeycomb structural body 10 is adjusted to 2 g/L, which is held at 600° C. for 1 hour to obtain a honeycomb catalyst.

(5) With respect to these samples of the honeycomb catalyst, the pore size is measured through a mercury penetration method (according to JISR1655:2003).

(6) The pore size of the obtained sample is measured using a micromeritics automatic porosimeter, Auto Pore III 9405, made by Shimadzu Corporation. The measured range is 0.006 μm-500 μm, in which the measurement in the range of 100 μm-500 μm, is conducted every a pressure of 0.1 psia and the measurement in the range of 0.006 μm-100 μm is conducted every a pressure of 0.25 psia. As a result, there are some peaks in the pore size distribution. The numerical values are shown in Table 2.

(7) Next, the light-off temperature shown in Table 2 is measured. The light-off temperature means a reaction temperature indicating a purification (conversion) efficiency of 50% when the purification (conversion) efficiency is a ratio of decreasing a concentration of specific components included in the exhaust gas by the catalyst. When the light-off temperature is low, the energy required for the purification (conversion) becomes small. That is, it can be said that a honeycomb catalyst having a low light-off temperature has an excellent catalytic performance. Therefore, the light-off temperature can be used as an indication showing a catalytic performance of the honeycomb catalyst.

Figure 5:
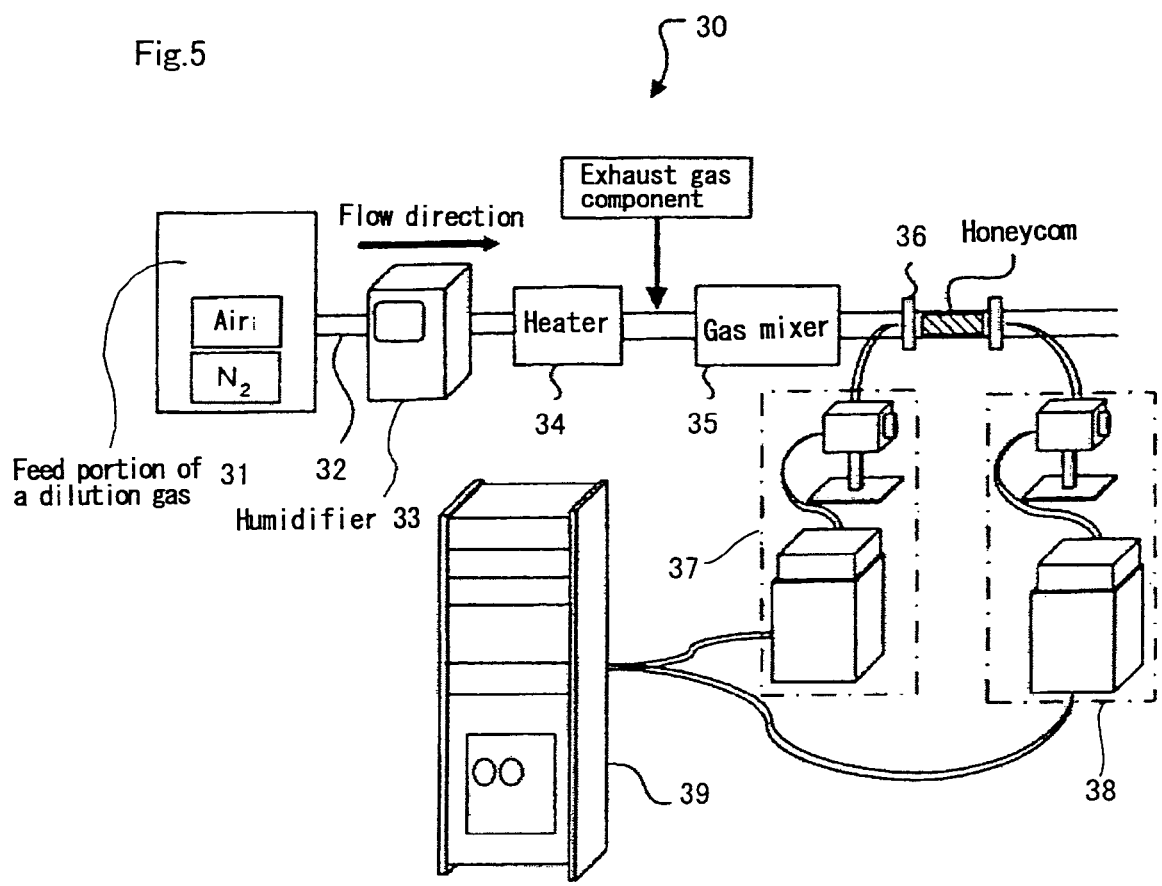
FIG. 5 is a schematic diagram of a catalyst reaction apparatus.
Figure 6C:
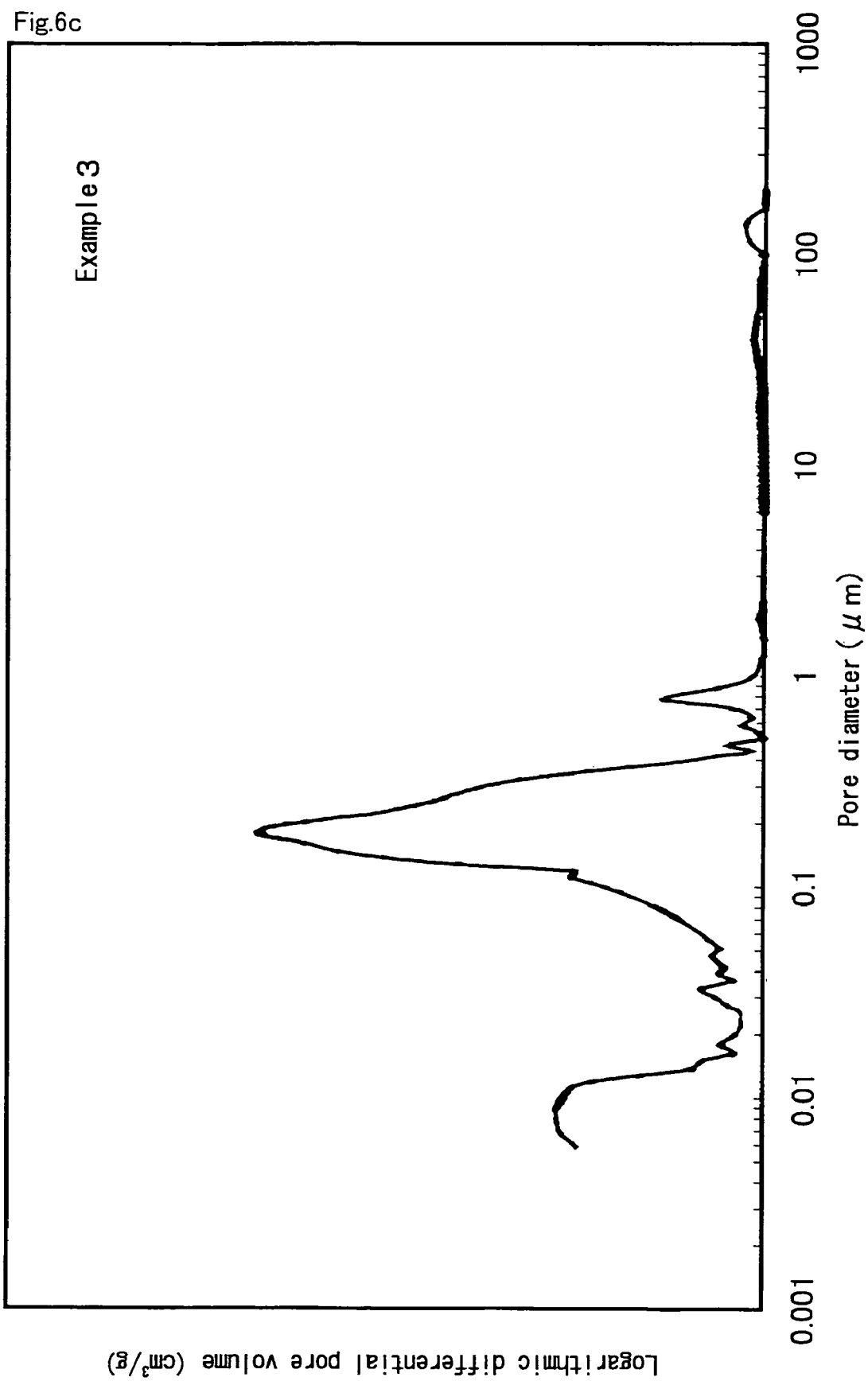
FIG. 6c is a graph showing a relation between a pore size and a pore volume in a honeycomb unit according to the invention (Example 3)
Figure 6D:
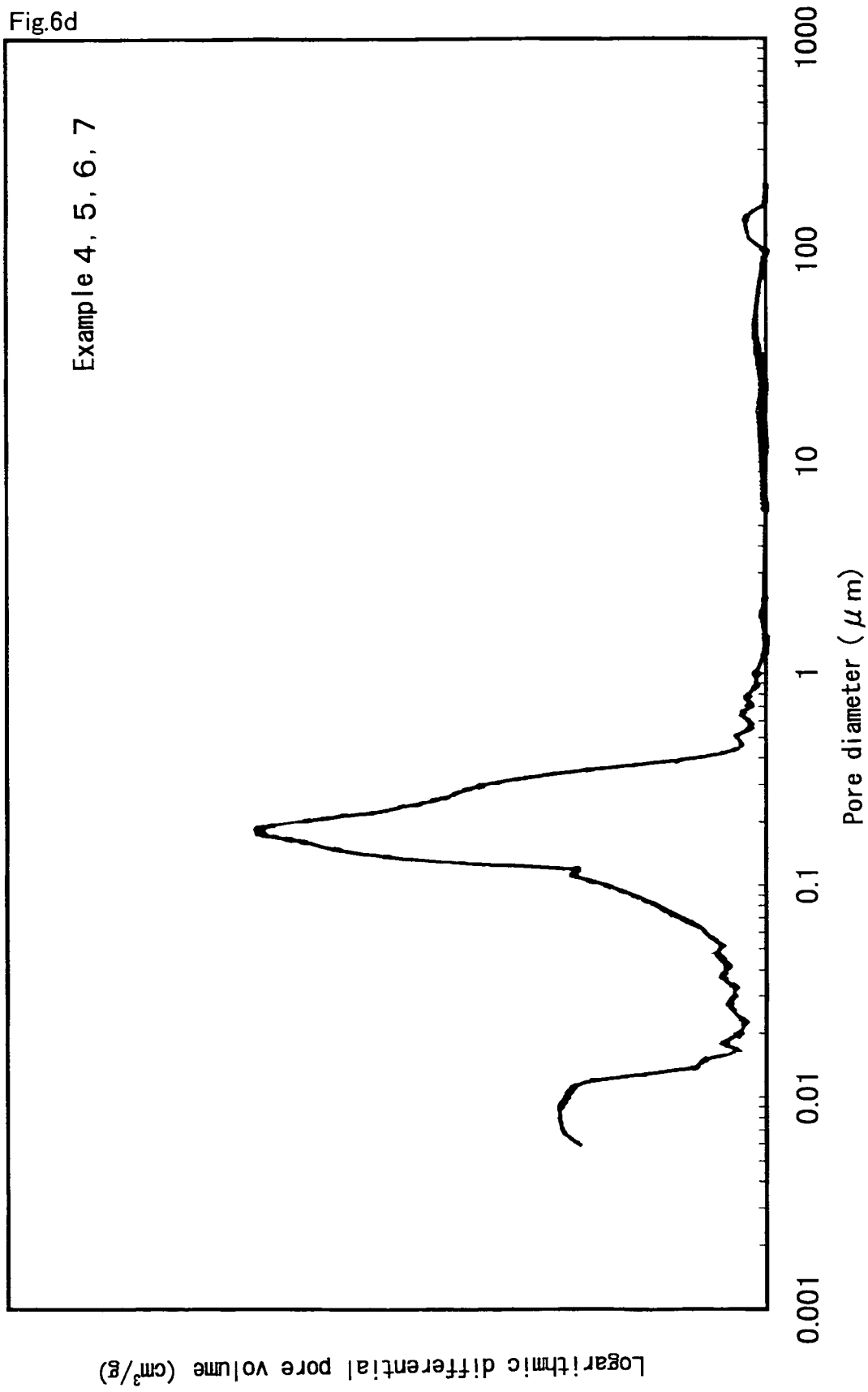
FIG. 6d is a graph showing a relation between a pore size and a pore volume in a honeycomb unit according to the invention (Examples 4-7)

(8) Here, the method of measuring the light-off temperature will be explained. The measurement can be conducted by using a catalytic reaction apparatus 30 shown in FIG. 5. The catalytic reaction apparatus 30 comprises a feed portion 31 of a dilution gas comprising air and nitrogen, a flow path 32 flowing the dilution gas to the honeycomb structural body, a humidifier 33 humidifying the dilution gas, a heater 34 heating the dilution gas, a gas mixer 35 mixing the heated dilution gas with an exhaust gas component to prepare a reaction gas, a sample holder 36 holding the honeycomb structural body in an air-tight condition, a gas sampler 37 sampling the reaction gas before the contact with the ceramic honeycomb structural body, a gas sampler 38 sampling the reaction gas after the contact with the ceramic honeycomb structural body and a gas analyzer 39 analyzing the concentration of the specific gas components included in the reaction gas.

(9) Hereinafter, the measurement process of the light-off temperature will be explained. At first, the honeycomb structural body is set in the sample holder 36 and air and nitrogen are flowed from the dilution gas feed portion 31 to the flow path 32 at a given flow rate. Then, the dilution gas is humidified through the humidifier 33 and the temperature of the dilution gas is adjusted through the heater 34. Next, the exhaust gas component is flown into the flown dilution gas from an upstream of the gas mixer 35 and mixed in the gas mixer 35 to prepare a reaction gas having a given concentration. Then, the thus prepared reaction gas is contacted with the honeycomb catalyst to conduct the purification (conversion) of the reaction gas. At this moment, the temperature of the heater 34 is properly changed to measure a temperature of the reaction gas inside the honeycomb catalyst at each temperature of the heater 34 through a thermocouple not shown. The concentration of the reaction gas sampled by the gas samplers 37 and 38 is measured through the gas analyzer 39.

In the measurement of the light-off temperature is used a honeycomb structural body having a shape of 34.3 mm square×150 mm as an Example or a Comparative Example. The catalytic reaction is conducted under conditions that a flow rate of the reaction gas is 131 (l/min), and the exhaust gas component comprises oxygen, carbon monoxide, sulfur dioxide, carbon hydride, nitrogen monoxide, steam and nitrogen, and an oxygen concentration in the reaction gas is 13%, and a carbon monoxide concentration is 300 ppm, and a sulfur dioxide concentration is 8 ppm and a hydrocarbon concentration is 200 ppm-C based on the amount of carbon, and a nitrogen monoxide concentration is 160 ppm, and a small amount of a humidification is added. Also, the reaction temperature is changed between 50-400° C. by changing the temperature of the heater 34 every 10° C., during which the concentrations of carbon monoxide and hydrocarbon among the components included in the reaction gas to be purified are measured by the gas analyzer 39. The purification (conversion) rate is calculated by the following equation:

Purification rate(%)=(CO—Ci)/CO×100 when the concentration of the reaction gas component before the contact with the catalyst is CO and the concentration of the reaction gas after the contact with the catalyst is Ci.

Thereafter, when the temperature of the reaction gas inside the honeycomb catalyst is a reaction temperature. a relation between each reaction temperature and the purification (conversion) efficiency is obtained. Then, the obtained reaction temperature is plotted as an abscissa and the purification (conversion) efficiency is plotted as an ordinate, and a temperature indicating a purification (conversion) rate of 50% is measured from the plotted data, which is defined as a light-off temperature.

Figure 7A:
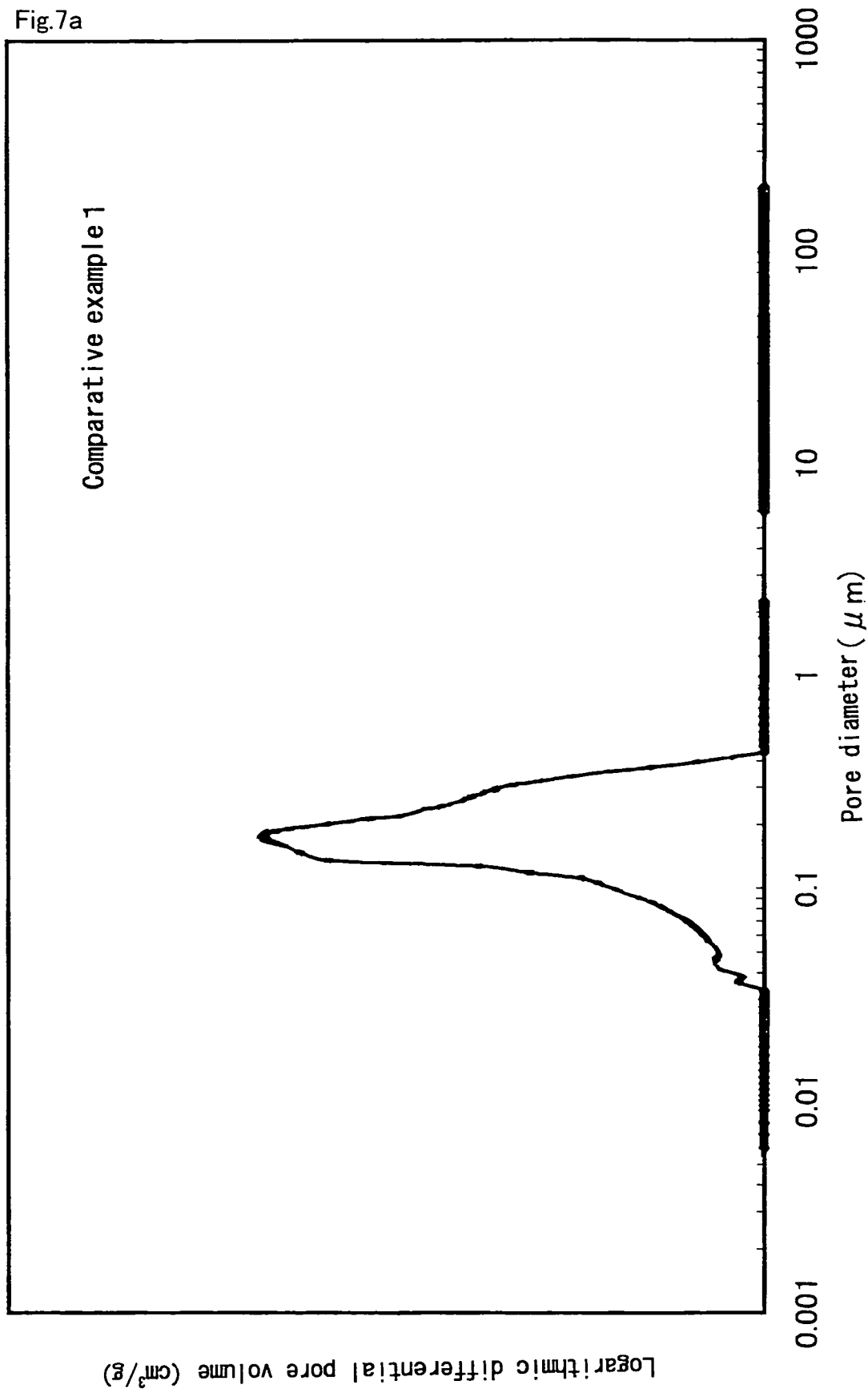
FIG. 7a is a graph showing a relation between a pore size and a pore volume in a honeycomb unit according to a comparative example (Comparative Example 1)
Figure 7B:
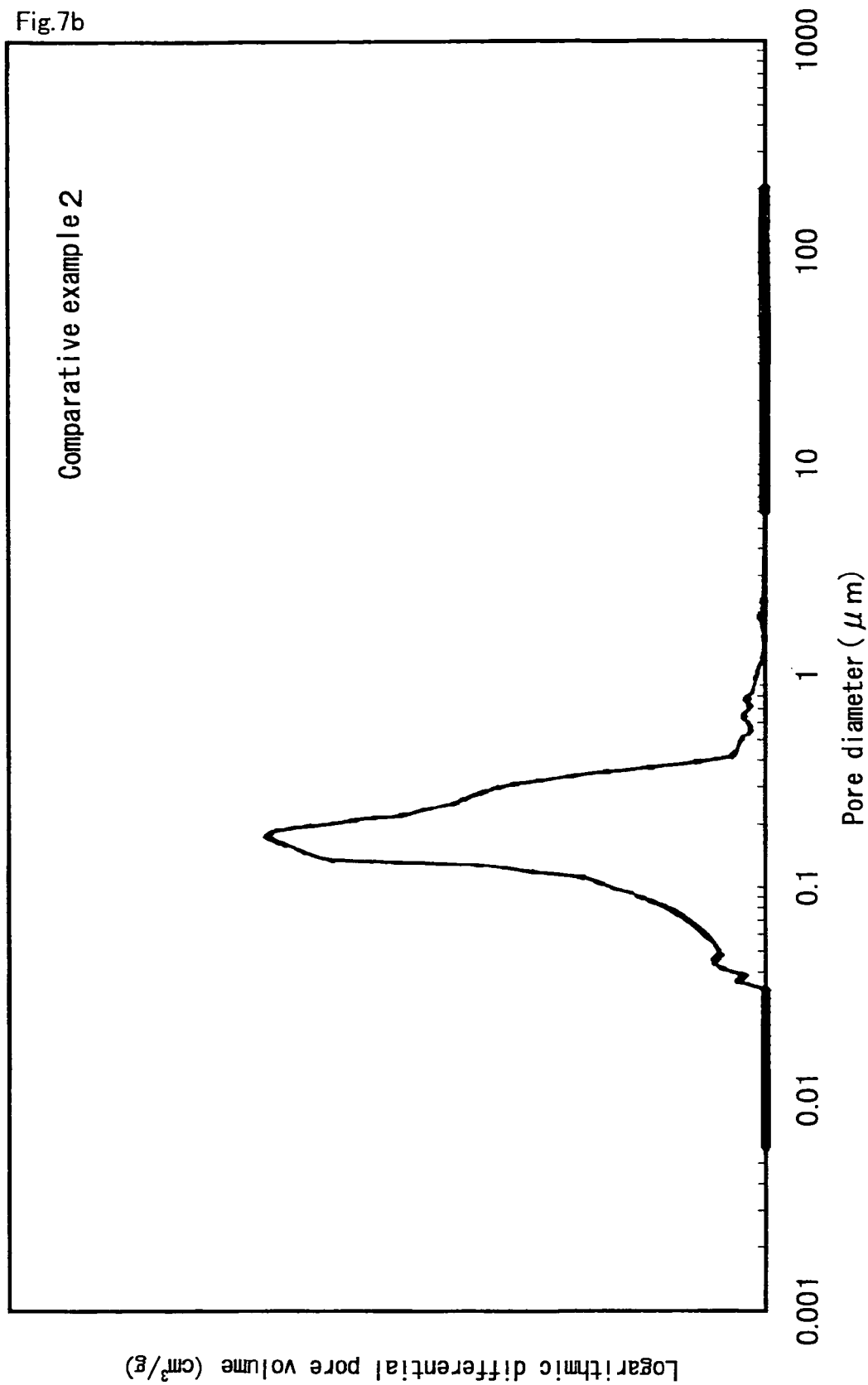
FIG. 7b is a graph showing a relation between a pore size and a pore volume in a honeycomb unit according to a comparative example (Comparative Example 2)
Figure 7C:
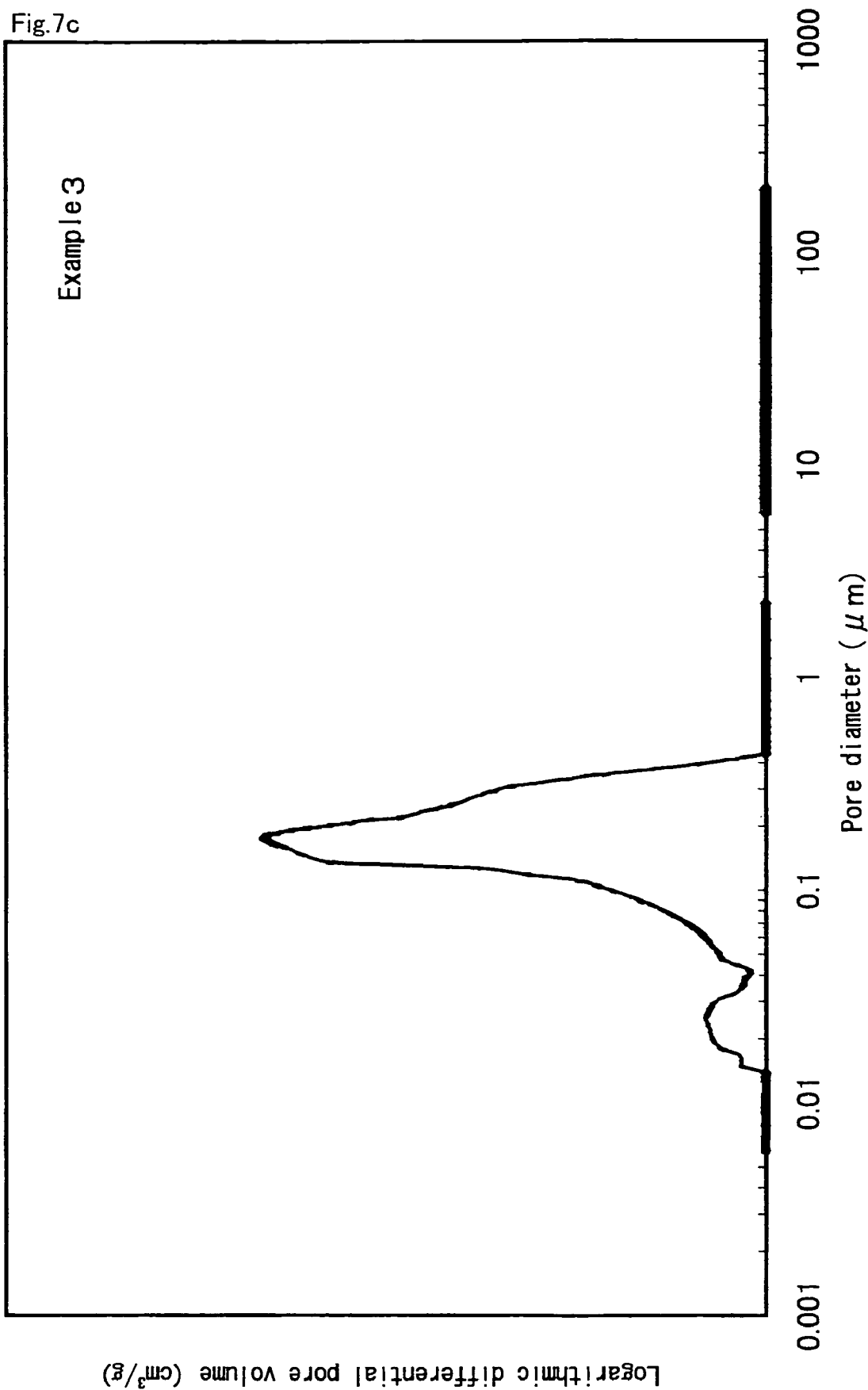
FIG. 7c is a graph showing a relation between a pore size and a pore volume in a honeycomb unit according to a comparative example (Comparative Example 3).

The results of the above test are shown in Table 2. As shown in Table 2, when the pore size distribution is within a range according to the invention (FIG. 6a-FIG. 6d), the light-off temperature (CO, HC) is low and the exhaust gas purification (conversion) efficiency increases, while in the comparative examples (FIG. 7a-FIG. 7c), the light-off temperature (CO, HC) is high and the exhaust gas purification (conversion) efficiency is poor.

TABLE 1

|  |  | A<br>Primary<br>particle<br>0.03 μm<br>Secondary<br>particle<br>2 μm | B<br>Primary<br>particle<br>0.03 μm<br>Secondary<br>particle<br>20 μm | C<br>Primary<br>particle<br>0.05 μm<br>Secondary<br>particle<br>2 μm | D<br>Primary<br>particle<br>0.05 μm<br>Secondary<br>particle<br>20 μm | Firing<br>temperature |
|---|---|---|---|---|---|---|
| Example | 1 | 100% | — | — | — | 800° C. |
|  | 2 | 50% | — | 50% | — | 800° C. |
|  | 3 | 25% | 25% | 25% | 25% | 800° C. |
|  | 4 | 40% | 10% | 40% | 10% | 800° C. |
|  | 5 | 40% | 10% | 40% | 10% | 800° C. |
|  | 6 | 40% | 10% | 40% | 10% | 800° C. |
|  | 7 | 40% | 10% | 40% | 10% | 800° C. |
| Comparative | 1 | 100% | — | — | — | 1100° C. |
| Example | 2 | 40% | 10% | 40% | 10% | 1100° C. |
|  | 3 | — | — | — | 100% | 1000° C. |

TABLE 2

|  | State of pore size distribution (μm) | | | | Wall<br>thickness<br>(mm) | Light-off<br>temperature<br>CO (° C.) | Light-off<br>temperature<br>HC (° C.) |
|---|---|---|---|---|---|---|---|
| Example 1 | 0.006-0.01 μm peak | Absence (discontinuous) | 0.05-0.5 μm peak | Absence (discontinuous) | 0.2 | 107 | 154 |
| Example 2 | 0.006-0.01 μm peak | 0.02-0.05 μm peak | 0.05-0.5 μm peak | Absence (discontinuous) | 0.2 | 106 | 149 |
| Example 3 | 0.006-0.01 μm peak | 0.02-0.05 μm peak | 0.05-0.5 μm peak | 0.5-1.0 μm peak | 0.2 | 106 | 151 |
| Example 4 | 0.006-0.01 μm peak | Presence (continuous) | 0.05-0.5 μm peak | Presence (continuous) | 0.2 | 107 | 155 |
| Example 5 | 0.006-0.01 μm peak | Presence (continuous) | 0.05-0.5 μm peak | Presence (continuous) | 0.1 | 110 | 157 |
| Example 6 | 0.006-0.01 μm peak | Presence (continuous) | 0.05-0.5 μm peak | Presence (continuous) | 0.2 | 116 | 163 |
| Example 7 (Reference Example) | 0.006-0.01 μm peak | Presence (continuous) | 0.05-0.5 μm peak | Presence (continuous) | 0.3 | 128 | 166 |
| Comparative Example 1 |  |  | 0.05-0.6 μm peak | Absence (discontinuous) | 0.2 | 156 | 196 |
| Comparative Example 2 |  |  | 0.05-0.5 μm peak | Presence (continuous) | 0.2 | 154 | 191 |
| Comparative Example 3 |  | 0.02-0.05 μm peak | 0.05-0.5 μm peak | Absence (discontinuous) | 0.2 | 152 | 186 |

INDUSTRIAL APPLICABILITY

According to the invention, when the partition walls are divided into a region of the first pore group of pores having a pore size of about 0.05 μm to about 150 μm and a region of the second pore group of pores having a pore size of about 0.006 μm to about 0.01 μm, the ceramic honeycomb structural body has a pore size distribution that one or more peaks (maximum value) of the pore size distribution are existent in each of the regions, so that it can be a honeycomb structural body for the purification (conversion) of the exhaust gas having a high purification (conversion) efficiency of the harmful exhaust gas.

Also, the invention can be used not only as an exhaust gas purification (conversion) apparatus of internal combustion engine but also as a purification (conversion) apparatus or filter of an exhaust gas discharged from a boiler, a heating furnace, a gas turbine, or various industrial processes.

Particularly, the ceramic honeycomb structural body according to the invention is used as a catalyst carrier for the purification (conversion) of the exhaust gas in the above various apparatuses, but also as an exhaust gas purification (conversion) apparatus of diesel engines. Also, the this honeycomb structural body can be used not only for the above applications, but also applications used without carrying the catalyst component (e.g., an absorbent absorbing a gas component or fluid component and the like).

The invention claimed is:

1. A ceramic honeycomb structural body, comprising:
a plurality of pillar-shaped honeycomb structural porous ceramic members, each comprising a plurality of through-holes arranged side by side through a partition wall, all of the through-holes being open on an end face of each of the porous ceramic members; and
a sealing material layer interposed between and adhering together the porous ceramic members,
wherein the porous ceramic member comprises ceramic particles, and inorganic fibers and/or whiskers;
an amount of the ceramic particles included in the porous ceramic member is 30 to 97 mass %;
an amount of the inorganic fibers and/or whiskers included in the porous ceramic member is 3 to 70 mass %;
a cross sectional area perpendicular to the porous ceramic member in its longitudinal direction is not less than 5 cm$^2$ but not more than 50 cm$^2$;
a ratio of the total cross sectional area perpendicular to the porous ceramic members in their longitudinal directions to a cross sectional perpendicular to the ceramic honeycomb structural body in its longitudinal direction is not less than 85%;
a first pore group having pores within a pore diameter range of about 0.05 μm to about 150 μm; and
a second pore group having pores within a pore diameter range of about 0.006 μm to about 0.01 μm,
wherein a pore size distribution curve for the ceramic member includes an abscissa in pore diameter (μm) and an ordinate in logarithmic differential pore volume (cm$^3$/g), such that one or more peaks exist in each of the pore diameter ranges.

2. A ceramic honeycomb structural body according to claim 1, wherein one or more peaks exist in a pore diameter range of about 0.05 μm to about 1.0 μm in the pore size distribution curve for the ceramic member.

3. A ceramic honeycomb structural body according to claim 1, wherein the pore size distribution curve is continuous when a value of a logarithmic differential pore volume is positive within a pore diameter range of about 0.01 μm to about 1.0 μm.

4. A ceramic honeycomb structural body according to claim 1, wherein the pore size distribution curve is continuous when a value of a logarithmic differential pore volume is positive in a range of the pore sizes between the peaks in the pore size distribution curve.

5. A ceramic honeycomb structural body according to claim 1, wherein the partition wall has a thickness of about 0.05 mm to about 0.35 mm.

6. A ceramic honeycomb structural body according to claim 1, wherein the ceramic member comprises an alumina as a main component.

7. A ceramic honeycomb structural body according to claim 1, wherein a catalyst is applied onto the surface of the partition wall.

8. An vehicle exhaust gas purification system, comprising:
a ceramic honeycomb structural body having a plurality of pillar-shaped honeycomb structural porous ceramic members, each comprising a plurality of through-holes arranged side by side through a partition wall, all of the through-holes being open on an end face of each of the porous ceramic members; and a sealing material layer interposed between and binding together the pillar-shaped honeycomb structural porous ceramic members,
wherein said porous ceramic members comprise ceramic particles, and inorganic fibers and/or whiskers;
an amount of the ceramic particles included in the porous ceramic member is 30 to 97 mass %;
an amount of the inorganic fibers and/or whiskers included in the porous ceramic member is 3 to 70 mass %;
a cross sectional area perpendicular to the porous ceramic member in its longitudinal direction is not less than 5 cm$^2$ but not more than 50 cm$^2$;
a ratio of the total cross sectional area perpendicular to the porous ceramic members in their longitudinal directions to a cross sectional perpendicular to the ceramic honeycomb structural body in its longitudinal direction is not less than 85%;
a first pore group having pores within a pore diameter range of about 0.05 μm to about 150 μm; and
a second pore group having pores within a pore diameter range of about 0.006 μm to about 0.01 μm,
wherein a pore size distribution curve for the ceramic member includes an abscissa in pore diameter (μm) and an ordinate in logarithmic differential pore volume (cm$^3$/g), such that one or more peaks exist in each of the pore diameter ranges.

9. A ceramic honeycomb structural body according to claim 1, wherein the porous ceramic member is formed by firing at material including the ceramic particles and inorganic fibers and/or whiskers at 600-1200° C.

10. A ceramic honeycomb structural body according to claim 1, wherein the porous ceramic member is an extrusion-molded body made from a material including ceramic particles, inorganic fibers and/or whiskers, and an inorganic binder.

* * * * *

UNITED STATES PATENT AND TRADEMARK OFFICE
CERTIFICATE OF CORRECTION

PATENT NO. : 8,192,517 B2  
APPLICATION NO. : 11/510590  
DATED : June 5, 2012  
INVENTOR(S) : Masafumi Kunieda Page 1 of 1

It is certified that error appears in the above-identified patent and that said Letters Patent is hereby corrected as shown below:

Please add the following to the Title page of the patent:

-- (63)    Related U.S. Application Data

Continuation of Application No. PCT/JP2005/021193, filed November 14, 2005. --.

Title page, item 30, line 1, "Nov. 14, 2005 (JP) 2005-0211393" should read

-- Dec. 27, 2004, (JP) .................................2004-375815 --.

Signed and Sealed this
Seventh Day of August, 2012

David J. Kappos
*Director of the United States Patent and Trademark Office*